United States Patent
Shiraishi et al.

(10) Patent No.: US 6,262,973 B1
(45) Date of Patent: Jul. 17, 2001

(54) SDH WIRELESS TRANSMISSION APPARATUS

(75) Inventors: Yuji Shiraishi; Ichiro Ayukawa; Kimihiko Yoshimura; Hisamichi Hazama; Kimio Watanabe; Shingo Mizuno; Tadayuki Sakama, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/165,433

(22) Filed: Oct. 2, 1998

(30) Foreign Application Priority Data

Apr. 20, 1998 (JP) .................................................. 10-109171

(51) Int. Cl.[7] .............................. G01R 31/08; H04J 1/16
(52) U.S. Cl. ............................................................... 370/228
(58) Field of Search .................................... 370/216, 225, 370/226, 227, 228

(56) References Cited

U.S. PATENT DOCUMENTS

| | | | | |
|---|---|---|---|---|
| 5,587,996 | * | 12/1996 | Mizuno | 370/228 |
| 6,061,329 | * | 5/2000 | Abe | 370/228 |
| 6,141,320 | * | 10/2000 | Ikawa | 370/227 |
| 6,144,633 | * | 11/2000 | Ikeda et al. | 370/217 |
| 6,163,526 | * | 12/2000 | Egoshi | 370/228 |

* cited by examiner

Primary Examiner—Ricky Ngo
(74) Attorney, Agent, or Firm—Helfgott & Karas, P.C.

(57) ABSTRACT

When a wireless channel fails, a working signal and a protection signal are synchronized and switching is performed without instantaneous disconnection. Each working unit of a plurality of working units is provided with a wireless-channel failure detector for detecting a failure that has occurred in a working wireless channel; a synchronization detecting circuit for detecting synchronization between a working wireless channel and a protection wireless channel; a changeover switch for selecting a signal from either the protection wireless channel or a working wireless channel without instantaneous disconnection; and a unit failure detector for detecting a failure that requires switching of a unit. When a failure develops in a wireless channel and a working wireless channel and the protection wireless channel are synchronized, a radio protection switching device controls the changeover switch to switch between working and protection wireless channels without instantaneous disconnection. Further, when failure that requires switching of a unit occurs, the radio protection switching device controls a unit changeover switch to switch between a working unit and the protection unit.

7 Claims, 28 Drawing Sheets

MSTU$_x$ : WIRELESS TRANSCEIVER AND BASEBAND PROCESSOR
BSW$_x$ : UNIT CHANGEOVER SWITCH
USW$_x$ : HITLESS CHANGEOVER SWITCH
RPS : RADIO PROTECTION SWITCHING
SCSU : SETTING/SUPERVISORY CONTROLLER

MSTU$_x$: WIRELESS TRANSCEIVER AND BASEBAND PROCESSOR
SW$_x$: WIRELESS CHANGEOVER SWITCH
RPS: RADIO PROTECTION SWITCHING
SCSU: SETTING/SUPERVISORY CONTROLLER

FIG.12A

| | ADDRESS OF STATUS ACQUISITION UNIT | IDENTIFIER |
|---|---|---|
| ACQUISITION ADDRESS FOR TRANSMISSION CHANNEL 1 | I/O ADDRESS OF WORKING UNIT $MSTU_1$ | IL1 |
| ACQUISITION ADDRESS FOR TRANSMISSION CHANNEL 2 | I/O ADDRESS OF WORKING UNIT $MSTU_2$ | IL2 |
| ACQUISITION ADDRESS FOR TRANSMISSION CHANNEL 3 | I/O ADDRESS OF WORKING UNIT $MSTU_3$ | IL3 |
| ACQUISITION ADDRESS FOR TRANSMISSION CHANNEL 4 | I/O ADDRESS OF WORKING UNIT $MSTU_4$ | IL4 |
| ⋮ | ⋮ | ⋮ |
| ACQUISITION ADDRESS FOR TRANSMISSION CHANNEL 7 | I/O ADDRESS OF WORKING UNIT $MSTU_7$ | IL7 |

FIG.12B

| | ADDRESS OF STATUS ACQUISITION UNIT | IDENTIFIER |
|---|---|---|
| ACQUISITION ADDRESS FOR TRANSMISSION CHANNEL 1 | I/O ADDRESS OF WORKING UNIT $MSTU_1$ | IL1 |
| ACQUISITION ADDRESS FOR TRANSMISSION CHANNEL 2 | I/O ADDRESS OF WORKING UNIT $MSTU_2$ | IL2 |
| ACQUISITION ADDRESS FOR TRANSMISSION CHANNEL 3 | I/O ADDRESS OF PROTECTION UNIT $MSTU_0$ | IL3 |
| ACQUISITION ADDRESS FOR TRANSMISSION CHANNEL 4 | I/O ADDRESS OF WORKING UNIT $MSTU_4$ | IL4 |
| ⋮ | ⋮ | ⋮ |
| ACQUISITION ADDRESS FOR TRANSMISSION CHANNEL 7 | I/O ADDRESS OF WORKING UNIT $MSTU_7$ | IL7 |

FIG.22 PRIOR ART

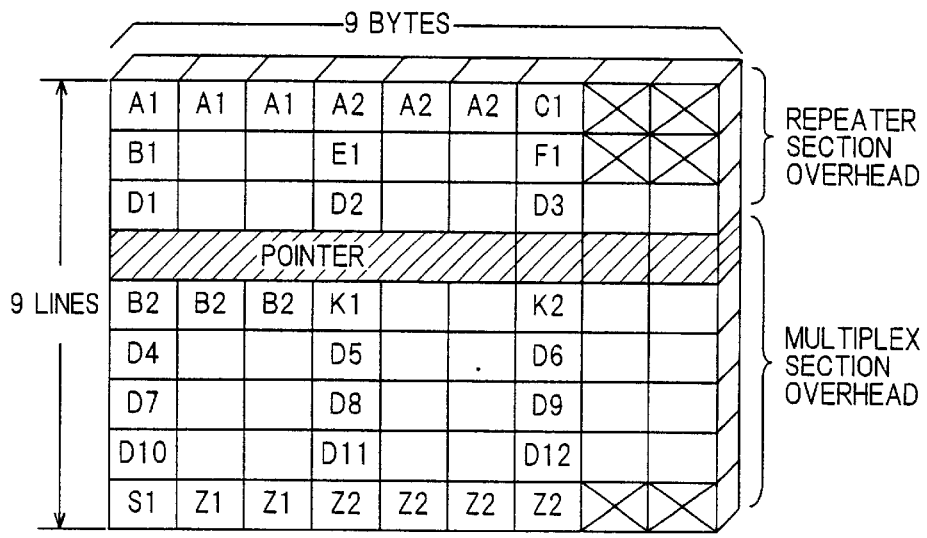

FIG.23 PRIOR ART

| SYMBOL | | USE IN NNI |
|---|---|---|
| REPEATER SECTION OVERHEAD | A1, A2 | FRAME SYNCHRONISM |
| | C1 | IDENTIFICATION NUMBER OF EACH STM-1 IN STM-N |
| | B1 | ERROR MONITORING IN REGENERATOR SECTION |
| | E1 | AUDIO ARRANGEMENTS IN REGENERATOR SECTION |
| | F1 | MALFUNCTION SPECIFICATION IN REGENERATOR SECTION |
| | D1~D3 | DATA COMMUNICATION IN REGENERATOR SECTION |
| MULTIPLEX SECTION OVERHEAD | B2 | SECTION ERROR MONITORING |
| | K1 | CONTROL OF CHANGEOVER SYSTEM |
| | K2 | TRANSFER OF MULTIPLEX SECTION STATUS |
| | D4~D12 | DATA COMMUNICATION IN MULTIPLEX SECTION |
| | S1 | QUALITY OF CLOCK    Sync Msg |
| | Z1 | MULTIPLEX STANDBY |
| | Z2 | NOTIFICATION OF MULTIPLEX ERROR STATUS |
| | B2 | AUDIO ARRANGEMENTS IN MULTIPLEX SECTION |

SDH WIRELESS TRANSMISSION APPARATUS

BACKGROUND OF THE INVENTION

This invention relates to a digital multiplexed wireless apparatus (SDH wireless transmission apparatus) using microwaves in an SDH (Synchronous Digital Hierarchy) network. More particularly, the invention relates to an SDH wireless apparatus, which has a plurality of working lines and at least one standby line, for sending and receiving wireless signals in which STM (Synchronous Transfer Mode) signals are used as baseband signals.

An SDH wireless transmission apparatus tends to have a large amount of hardware owing to the size of its transmission capacity. There is increasing need to reduce the size and cost of such apparatus.

In addition, demand for integrated supervision of wireless transmission apparatus and equipment such as optical transmitters and switches has grown in recent years. In SDH communication networks, supervisory control systems are being standardized in accordance with ITU-T and other recommendations, and the need for integrated supervision that is not media-dependent is growing year by year.

In SDH network management, moreover, there is a need for consolidated management of communication devices supplied by a plurality of vendors. However, SDH networks employ additional signals referred to as SOH (Section Overhead) and, though methods of using SOH are being decided by ITU-T, etc., whether or not SOH is used and methods of using SOH differ subtly from one manufacturer to another. As a consequence, an expedient sometimes adopted is to change the way overhead is used as by setting the method of use, thereby making it possible to deal with equipment manufactured by multiple vendors. However, the setting of the equipment and the method of use become more complicated and cost rises. The present invention concerns an SDH wireless transmission apparatus that addresses these difficulties.

The application of SDH techniques in networks is progressing especially in the field of optical transmission. There are cases in which such an SDH communications network incorporates wireless transmission channels. For example, in a case where an SDH communications network is constructed across the ocean or across steep mountainous areas, an optical cable must be laid on the ocean floor or across mountainous terrain. However, the work for laying such cables is a major undertaking and requires great expenditures. When an SDH communications network is constructed in areas where the laying of cable is difficult, as in the case of the ocean floor or steep mountain ranges, an optical transmission line is laid as far as the entrance to the area, an optical transmission line is laid from the exit of the area and a wireless transmission path (channel) is introduced between these two optical transmission lines.

FIG. 19 illustrates an example of the arrangement of an SDH network in which a wireless transmission path is introduced into an optical transmission line. Transmission is performed upon terminating the redundant lines of the optical transmission path. The network includes optical transmission units $1a$, $1b$ and wireless units $2a$, $2b$. Optical transmission lines $3_{1W} \sim 3_{2P}$ are laid between the optical transmission unit $1a$ and the wireless unit $2a$. The optical transmission lines $3_{1W}$, $3_{2W}$ are working channels, and the optical transmission lines $3_{1P}$, $3_{2P}$ are protection (i.e., standby) channels. The protection channels $3_{1P}$, $3_{2P}$ become working channels when failures develop in the working channels $3_{1W}$, $3_{2W}$, respectively. Identical data is transmitted on the working channels and protection channels.

Numerals $4_{1W}$, $4_{2W}$ denote wireless working channels provided to correspond to the optical working channels $3_{1W}$, $3_{2W}$, respectively. Numeral $4_P$ represents one wireless protection channel. The wireless unit $2a$ terminates the optical protection channels and transmits data from the optical working channels $3_{1W}$, $3_{2W}$ to the opposing wireless unit $2b$ via the wireless working channels $4_{1W}$, $4_{2W}$. Further, when a failure has developed in one of the wireless working channels $4_{1W}$, $4_{2W}$, the wireless unit $2a$ transmits data, which has been accepted from the corresponding optical working channel, to the wireless unit $2b$ via the wireless protection channel $4_P$, thereby relieving the failed wireless working channel.

Optical transmission lines $5_{1W} \sim 5_{2P}$ are laid between the wireless unit $2b$ and the optical transmission unit $1b$. The optical transmission lines $5_{1W}$, $5_{2W}$ are working channels, and the optical transmission lines $5_{1P}$, $5_{2P}$ are protection channels. The protection channels $5_{1P}$, $5_{2P}$ become the working channels when failures develop in the working channels $5_{1W}$, $5_{2W}$, respectively. The wireless unit $2b$ sends the optical working channel $5_{1W}$ and the optical protection channel $5_{1P}$ data accepted from the first wireless working channel $4_{1W}$ or wireless protection channel $4_P$ (at the time of failure), and sends the optical working channel $5_{2W}$ and the optical protection channel $5_{2P}$ data accepted from the second wireless working channel $4_{2W}$ or wireless protection channel $4_P$ (at the time of failure). As a result, identical data is transmitted to the optical working channels and optical protection channels.

In FIG. 19, an optical working channel and an optical protection channel form a pair, and two of such pairs are provided. However, N ($\geq 2$) pairs are provided ordinarily. More specifically, the optical channels consist of N pairs of optical working channels and optical protection channels. The wireless channels have wireless working channels corresponding to the N-number of optical working channels as well as one wireless protection channel.

FIG. 20 is a diagram for describing the structure of a frame in SDH. This is for a transmission rate of 155.52 Mbps. One frame is composed of 9×270 bytes. The first 9×9 bytes constitute section overhead (SOH), and the remaining bytes constitute path overhead (POH) and payload (PL).

Section overhead SOH transmits information (a frame synchronizing signal) representing the beginning of the frame, information specific to the transmission line (namely information which checks for error at transmission time, information for network maintenance, etc.) and a pointer indicating the position of the path overhead POH. Path overhead POH transmits end-to-end supervisory information within a network. The payload PL is a section which transmits 150-Mbps information.

The section overhead SOH is composed of regenerator section overhead of 3×9 bytes, a pointer of 1×9 bytes and multiplex section overhead of 5×9 bytes. As shown in FIG. 21, the multiplex section is the section between terminal repeater units 11, 12. In a case where a number of transmission lines $13a \sim 13c$ and repeaters $14a$, $14c$ are provided between the terminal repeater units 11, 12, the regenerator section is the section between both ends of one transmission line, and the multiplex section is composed of a plurality of regenerator sections.

As shown in FIG. 22, the regenerator section overhead has bytes A1~A2, C1, B1, E1, F1, D1~D3, and the multiplex section overhead has bytes B2, K1~K2, D4~D12, S1, Z1~Z2. The meaning of each byte is illustrated in FIG. 23. The regenerator section overhead and multiplex section overhead have a number of undefined bytes. Use of these bytes is left to the communications manufacturer concerned.

The K1 byte among the overhead bytes is used mainly to request switching and designates the level of the switch request and the switched line. The K2 byte is used mainly to respond to the K1 byte and indicates whether the system is 1:1 or 1:N (number of working channels with respect to one protection channel), the type of changeover mode, content of a failure, etc. There are two types of switching modes, namely a unidirectional mode, in which only a signal in one direction is changed over, and a bidirectional mode, in which signals in both directions are changed over simultaneously.

FIGS. 24A, 24B are diagrams useful in describing switching sequences using the K1, K2 bytes. In the case of the unidirectional mode, the K1 byte (switch request) is sent to a station A if a station B detects SF, as shown in FIG. 24. The station A performs bridge control in regard to the line specified by the K1 byte (switch request) that has been received. Bridge control is control for sending identical signals to both working and protection channels. After performing bridge control, the station A transmits the K2 byte (switch response), which is in response to the received K1 byte, to the opposite station (station B). Upon receiving the K2 byte, the station B performs switch control. Switch control is control for switching a designated line signal in the receiving direction to a protection channel.

In the case of the bidirectional mode, the K1 byte (switch request) is sent to station A if station B detects SF, as shown in FIG. 24B. Station A performs bridge control in regard to the line specified by the K1 byte (switch request) that has been received, sends back the K2 byte (switch response) in the same manner as in the unidirectional mode and, at the same time, sends the K1 byte designating "reverse request" (RR). Upon receiving RR, station B performs switch control and bridge control in regard to the line that was designated by the K1 byte sent by the B station itself and sends the K2 byte (switch response) to the opposite station (station A). Upon receiving the K2 byte, station A performs switch control.

FIG. 25 is a diagram showing the construction of a wireless transmission apparatus according to the prior art. The apparatus includes a baseband processing unit (BB) 21 which executes baseband processing such as processing for interfacing an SDH transmission line and processing for inserting/extracting overhead, a transceiving unit 22 having transmitters $TX_W$, $TX_P$ in working and protection routes, respectively, as well as receivers $RX_W$, $RX_P$ in the working and protection routes, respectively, and a switch 23, which is for switching between the working and protection routes, having a transmitter changeover switch $SW_T$ and a receiver changeover switch $SW_R$.

FIG. 26 illustrates the transmitting route or receiving route of the wireless transmission apparatus, which is depicted in FIG. 25, when expressed in the form of function blocks. Numerals 24, 25 denote functional sections on the wired and wireless sides, respectively. The functional section 24 on the wired side includes an SDH physical interface SPI, a regenerator section termination RST, a multiplex section termination MST, and a multiplex section adaptation MSA. The functional section 25 on the wireless side includes a multiplex section adaptation MSA, a multiplex section termination MST, a regenerator section termination RST, working and protection radio SDH physical interfaces RSPI, and radio protection switching RPS for switching between working and protection channels by controlling the switch 23 (FIG. 25) in response to failure in a wireless channel.

When a wireless channel fails in the wireless transmission apparatus according to the prior art, only the wireless side can be changed over synchronously without instantaneous disconnection by the switch 23 provided on the wireless side. Since the wired side is not changed over owing to the failure in the wireless channel, there is no change in the channel identifier used when the host device is notified of the supervisory information on the wired side. This is advantageous in that management is facilitated. With the wireless transmission apparatus according to the present invention, however, the baseband processing unit, working transmitter $TX_W$, protection transmitter $TX_P$, working receiver $RX_W$ and protection receiver $RX_P$ are individual units that are formed on separate boards. A problem that arises is large size and high cost.

Accordingly, there has been proposed a wireless transmission apparatus in which the baseband processor, modulator/demodulator and transceiver have been unified (consolidated into one unit) to the maximum extent in order to lower the cost of the hardware and conserve space. FIG. 27 is a block diagram illustrating such a wireless transmission apparatus. The apparatus includes units $K_1$–$K_n$, $K_p$ each obtained by unifying a baseband processor, modulator/demodulator and transceiver. The units $K_1$–$K_n$ are working units provided for corresponding working channels 1–n, and the unit $K_p$ is a protection unit provided for a corresponding protection channel. The apparatus further includes a receiving filter & antenna duplexer BR; an antenna ANT; sending-end and receiving-end changeover switches $SW_1$–$SW_n$ provided on the transmission-line side of the working units $K_1$–$K_n$, respectively, for changing over between working and protection units; and a supervisory controller SV having a function for supervising the status of each unit, a function for working/protection switching control (channel control) in response to occurrence of failure, a function for supplying a timing clock and an order wire communication method. FIG. 28 is a block diagram showing the functions of the wireless transmission apparatus illustrated in FIG. 27. Components identical with those shown in FIG. 27 are designated by like reference characters. Numerals 24, 25 denote the functional sections on the wired and wireless sides, respectively. The apparatus includes radio protection switching RPS for switching between working and protection units by controlling the switches $SW_1$–$SW_n$ in accordance with predetermined logic, SDH physical interfaces SPI, regenerator section terminations RST, multiplex section terminations MST, multiplex section adaptations MSA and radio SDH physical interfaces RSPI.

The wireless transmission apparatus of FIG. 27 is advantageous in that the cost of hardware is less and more space is conserved in comparison with the wireless transmission apparatus of FIG. 25. However, since the changeover switches are provided at a position opposite from the wireless side, it is difficult to synchronize the working and protection signals and perform switching without instantaneous disocnnection at the time of switching. (Synchronization is performed by the RSPIs.)

Thus, with the first wireless transmission apparatus (FIG. 25) according to the prior art, a signal processor on the transmitting side for receiving a baseband signal, modulating the signal and converting the signal to a radio frequency and a signal processor on the receiving side for, conversely, receiving a radio-frequency signal, demodulating the signal and transmitting the signal as a baseband signal are constructed as individual units on a per-block basis. However, in order to reduce size and lower cost with modern large-capacity wireless apparatus (STM1-level, 156M wireless transmission apparatus, etc.), it is so arranged that all or part of both the signal processor on the transmitting side and signal processor on the receiving side be packaged as a single unit as in the second wireless transmission apparatus (FIG. 27) according to the prior art. Consequently, though switching can be performed without instantaneous disconnection at occurrence of an error in a wireless channel with the arrangement of FIG. 25, the arrangement of FIG. 27 in which the processors are consolidated requires that switching be performed outside the unit, thereby making it difficult to perform switching without instantaneous disconnection.

Further, in a case where the transmitting processor and the receiving processor are included in one unit as in the second wireless transmission apparatus of the prior art, it is necessary to switch both sent and received signals to the protection unit $K_p$ when a working unit is replaced. In general, however, in order to reduce line interruption due to switching, line switching is carried out by switching the transmitting side and receiving side separately. When the unit is replaced, therefore, it is necessary to perform switching manually on each side. The result is a troublesome unit switching operation.

Furthermore, even if a failure develops in a wireless channel, the second wireless transmission apparatus is such that the function blocks on the wired side also are changed over at the same time. As a consequence, even the identifier of supervisory information on the wired side that originally has no relation to the failure is changed, and the host monitoring device must be aware of both supervision on the wired side and changeover on the wireless side. In case of network supervision, a transmission line can be regarded as a single end-to-end pipe without taking into account the transmission medium (see transmission lines 1 and 2 in FIG. 29). Accordingly, even though working/protection unit changeover is performed within a wireless apparatus, data flows through the same transmission path (transmission paths 1 and 2 in FIG. 29) as far as the network is concerned. However, with the wireless transmission apparatus of FIG. 27, the protection and working channels are regarded as different transmission channels and the supervisory information of the working units and protection unit is regarded as the supervisory information of different transmission channels. Therefore, if working unit $K_1$ is switched over to protection unit $K_p$, as shown in FIG. 30, the supervisory controller SV shown in FIG. 31 sends the status information of working unit $K_1$ to a host device OPS as information of transmission line 1 before the unit changeover but sends the status information of protection unit $K_p$ to a host device OPS as information of transmission line 0 after the changeover to the protection unit $K_p$ is made. In other words, the identifier is changed before and after the working/protection unit changeover and then the status information is reported to the host device. This means information detected from a working unit and information detected from a protection unit must each be managed (output) separately. As a result, the network manager must have knowledge of a changeover state that is specific to the wireless medium.

SUMMARY OF THE INVENTION

Accordingly, an object of the present invention is to provide an SDH wireless transmission apparatus in which the cost of hardware can be reduced and space conserved, and in which switching can be performed without instantaneous disconnection by synchronizing working and protection signals.

Another object of the present invention is to provide an SDH wireless transmission apparatus in which a changeover to a protection unit can be made automatically when a unit is replaced.

A further object of the present invention is to provide an SDH wireless transmission apparatus in which, when a working/protection changeover has been made, the protection unit and the working unit prior to its changeover are considered units on the same transmission channel (same transmission line) and the identifiers assigned to the status information of each of the units can be made the same.

A further object of the present invention is to provide an SDH wireless transmission apparatus in which it is possible to shorten working/protection changeover time and rollback time.

According to the present invention, an SDH wireless transmission apparatus is constructed by providing, for each of working channels and at least one protection channel, a unit obtained by unifying a baseband processor having a function for terminating an SDH interface and a wireless transceiver having a modulating/demodulating function and a transceiving function, providing, on a wired side of the working unit, a switch ($BSW_1$–$BSW_7$) for switching a prescribed working unit ($MSTU_1$–$MSTU_7$) to the protection unit ($MSTU_0$), and providing radio protection switching means (RPS) for collecting failure information from each of the working units and from the protection unit, and switching between working units and the protection unit by driving the unit changeover switch in accordance with predetermined logic. Further, a working unit provided for a corresponding working channel is provided with a wireless-channel failure detector for detecting a failure that has occurred in a working wireless channel, a synchronization detecting circuit for detecting synchronization between a working wireless channel and a protection wireless channel, a receiving switch ($USW_1$–$USW_7$) for selecting a signal from either the protection wireless channel or a working wireless channel, and a unit failure detector for detecting a failure that requires switching of a unit. (1) When a failure has developed in a wireless channel and a working wireless channel and the protection wireless channel become synchronized, the radio protection switching means (RPS) controls the receiving switch, selects a signal from the protection wireless channel and inputs the signal to the baseband processor without instantaneous disconnection. (2) When a failure that requires switching of a unit has occurred, the radio protection switching means (RPS) controls the unit changeover switch and switches between a working unit and the protection unit.

If the arrangement described above is adopted, the hardware can be lowered in cost and space can be conserved by unifying the baseband processor, modulator/demodulator and transceiver. Further, switching can be performed without instantaneous disconnection while synchronizing working and protection signals.

Further, the working unit is provided with a transmitting switch for selectively (1) transmitting a signal solely from a working wireless channel or (2) transmitting a signal via working and protection wireless channels simultaneously. When a failure has developed in a wireless channel, the radio protection switching means requests the radio protection switching means of an opposite station to transmit a signal to working and protection wireless channels simultaneously, and the radio protection switching means (RPS) of the opposite station responds to the request by changing over the transmission switch provided in a working unit of the opposite station, whereby a signal is transmitted to working and protection wireless channels simultaneously. If this arrangement is adopted, signals can be received from the opposite station by way of protection and working channels if a wireless channel has failed. As a result, these signals can be synchronized and switching without instantaneous disconnection becomes possible.

Further, the working unit is provided with a unit-packaging detector for detecting whether the unit has been packaged with the wireless transmission apparatus. The radio protection switching means (RPS) switches between a working unit and the protection unit by controlling the unit changeover switch in response to non-packaging of the unit. This makes it possible to switch to the protection unit automatically when a unit is replaced. The operation for replacing a unit can be performed with ease.

Further, a channel failure detector is provided at a point downstream of the signal from the receiving switch ($USW_1$–$USW_7$) in the working unit. When channel failure has been detected by the channel failure unit after switching owing to wireless channel failure, the radio protection switching means regards the failure as being a failure in the working unit and controls the unit changeover switch to switch between the working unit and the protection unit. If this arrangement is adopted, unit changeover can be performed to continue communication even in a case where a changeover is made to the protection channel and a channel failure is detected at a point beyond the changeover switch.

Further, the SDH wireless transmission apparatus is provided with a supervisory controller (SCSU) for acquiring the status of each unit of the wireless transmission apparatus, appending an identifier of the transmission channel to which the unit belongs to the acquired information and then notifying the host device. The supervisory controller has a table for retaining correspondence between identifiers and units. When a working unit has been switched to the protection unit, the content of the table is altered in such a manner that the protection unit instead of the working unit will correspond to the prevailing identifier. As a result, even if a changeover occurs between working and protection units, the protection unit and the working unit that was active prior to its changeover are considered units on the same transmission line and the identifiers appended to the status information of each unit can be made the same, thereby facilitating status management.

Further, the SDH wireless transmission apparatus is provided with a supervisory controller (SCSU) for receiving a command from the host device and writing setting information, which is based upon the command, to a prescribed unit. Upon receiving a command from the host device, the supervisory controller determines whether unit changeover from a working unit to the protection unit has occurred and checks the number of this working unit. If unit changeover is not in progress, the supervisory controller writes the setting information solely to the working unit. If unit changeover is in progress, the supervisory controller writes the setting information to both the protection unit and the working unit prior that was acting prior to the changeover. If this arrangement is adopted, it is unnecessary to copy the setting information from the protection unit to the working unit when rollback is performed from the protection unit to the working unit at recovery of the working unit. As a result, rollback to the working unit can be performed in a short period of time.

Further, the supervisory controller compares the setting information of the working unit with that of the protection unit at unit changeover from the working unit to the protection unit. If the compared items of information do not match, the supervisory controller copies the setting information from the working unit to the protection unit. If the items of information match, the setting information is not copied. Accordingly, when a working unit develops a failure and a changeover from the working unit to the protection unit is performed, copying of information is unnecessary if the information coincides. As a result, it is possible to shorten changeover time.

Other features and advantages of the present invention will be apparent from the following description taken in conjunction with the accompanying drawings.

BRIEF DESCRIPTION OF THE DRAWINGS

FIGS. 12A, 12B are diagrams useful in describing a table;

FIG. 22 is a diagram for describing section overhead according to the prior art;

FIG. 23 is a diagram for describing the meaning of each byte in section overhead according to the prior art;

DESCRIPTION OF THE PREFERRED EMBODIMENTS (A) First embodiment of synchronous changeover without instantaneous disconnection (a) Overall construction FIG. 1 is a block diagram of an SDH wireless transmission apparatus for implementing synchronous switching without instantaneous disconnection according to the present invention. The apparatus includes units $MSTU_0$–$MSTU_7$ each obtained by unifying a baseband processor, a modulator/de-modulator and a wireless transceiver. Units $MSTU_1$–$MSTU_n$ are working units provided for corresponding ones of transmission lines (channels) 1–n, and the unit $MSTU_0$ is a protection unit provided for standby. The apparatus further includes a receiving filter & antenna duplexer BRNET; an antenna ANT; unit changeover switches $BSW_1$–$BSW_7$ provided on the transmission-line side externally of the working units $MSTU_1$–$MSTU_n$, respectively, for changing over between working and protection units; changeover switches $USW_1$–$USW_7$ provided on the wireless side internally of the working units $MSTU_1$–$MSTU_n$ for switching wireless channels between the working and protection units without instantaneous disconnection (a changeover switch for switching without instantaneous disconnection is referred to as "a hitless changeover switch"); and a combining brancher SUBR provided within the protection unit $MSTU_0$. The combining brancher SUBR selects, and delivers to the antenna, signals input via the unit changeover switches $BSW_1$–$BSW_7$ and transmission signals input via the hitless changeover switches $USW_1$–$USW_7$, and for distributing received signals from the antenna side to the side of the unit changeover switches $BSW_1$–$BSW_7$ and hitless changeover switches $USW_1$–$USW_7$.

A radio protection switching device RPS is connected to the unit changeover switches $BSW_1$–$BSW_7$ and units $MSTU_0$–$MSTU_7$. (1) When a wireless channel fails, the radio protection switching device RPS performs hitless switching control by controlling the switches $USW_1$–$USW_7$ in accordance with predetermined logic. (2) When a unit fails or when a unit has not been packaged with the apparatus, the radio protection switching device RPS performs a unit working/protection changeover by controlling the switches $BSW_1$–$BSW_7$ in accordance with predetermined logic. For example, (1) when the wireless channel of transmission line 1 fails and the working and protection wireless channels have been synchronized, the radio protection switching device RPS controls the hitless changeover switch $USW_1$ to select the signal from the protection wireless channel and input the signal to the baseband processor without instantaneous disconnection (see A in FIG. 1). (2) When a failure requiring changeover of the working unit $MSTU_1$ occurs, the radio protection switching device RPS controls the unit changeover switch $BSW_1$ to switch between the working unit $MSTU_1$ and the protection unit $MSTU_0$ (see B in FIG. 1). A setting/supervisory controller SCSU, which is connected to each of the units $MSTU_0$–$MSTU_7$ so as to be capable of communicating therewith, receives setting information from a host device, writes the setting information to a prescribed unit and, when a changeover is made between working and protection units, copies the setting information of the working unit to the protection unit.

Figure 1:
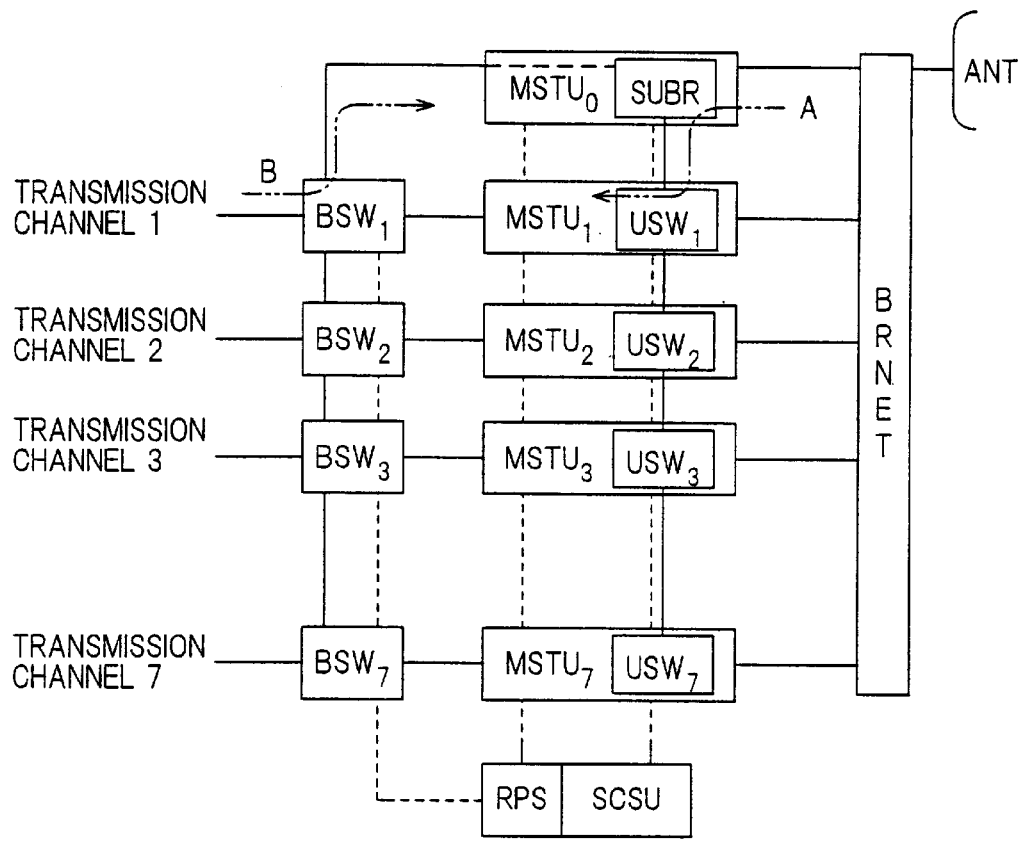
FIG. 1 is a block diagram of an SDH wireless transmission apparatus for implementing switching without instantaneous disconnection according to the present invention.
Figure 2:
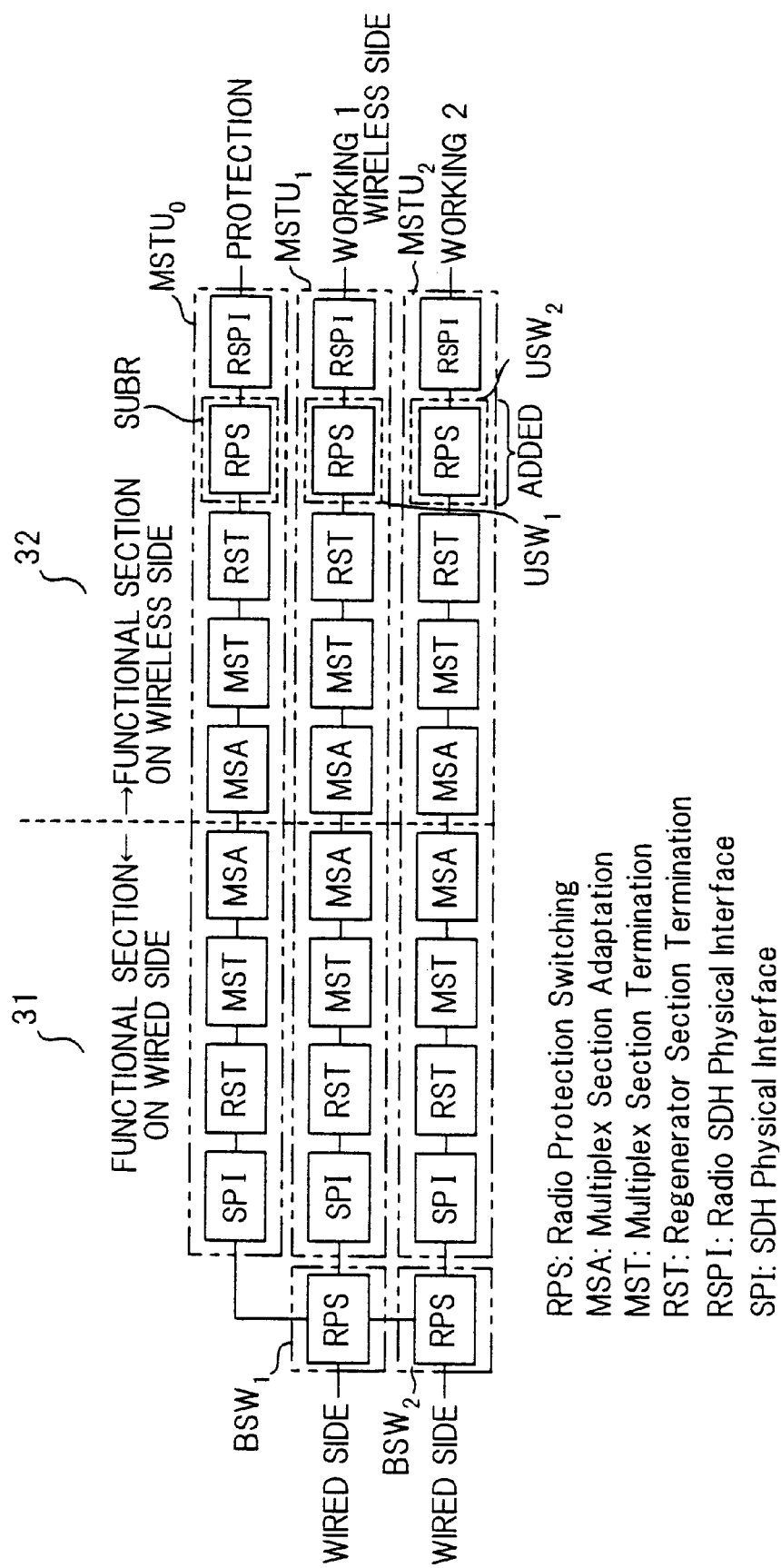
FIG. 2 is a functional block diagram of the wireless communication apparatus shown in FIG. 1.
Figure 27:
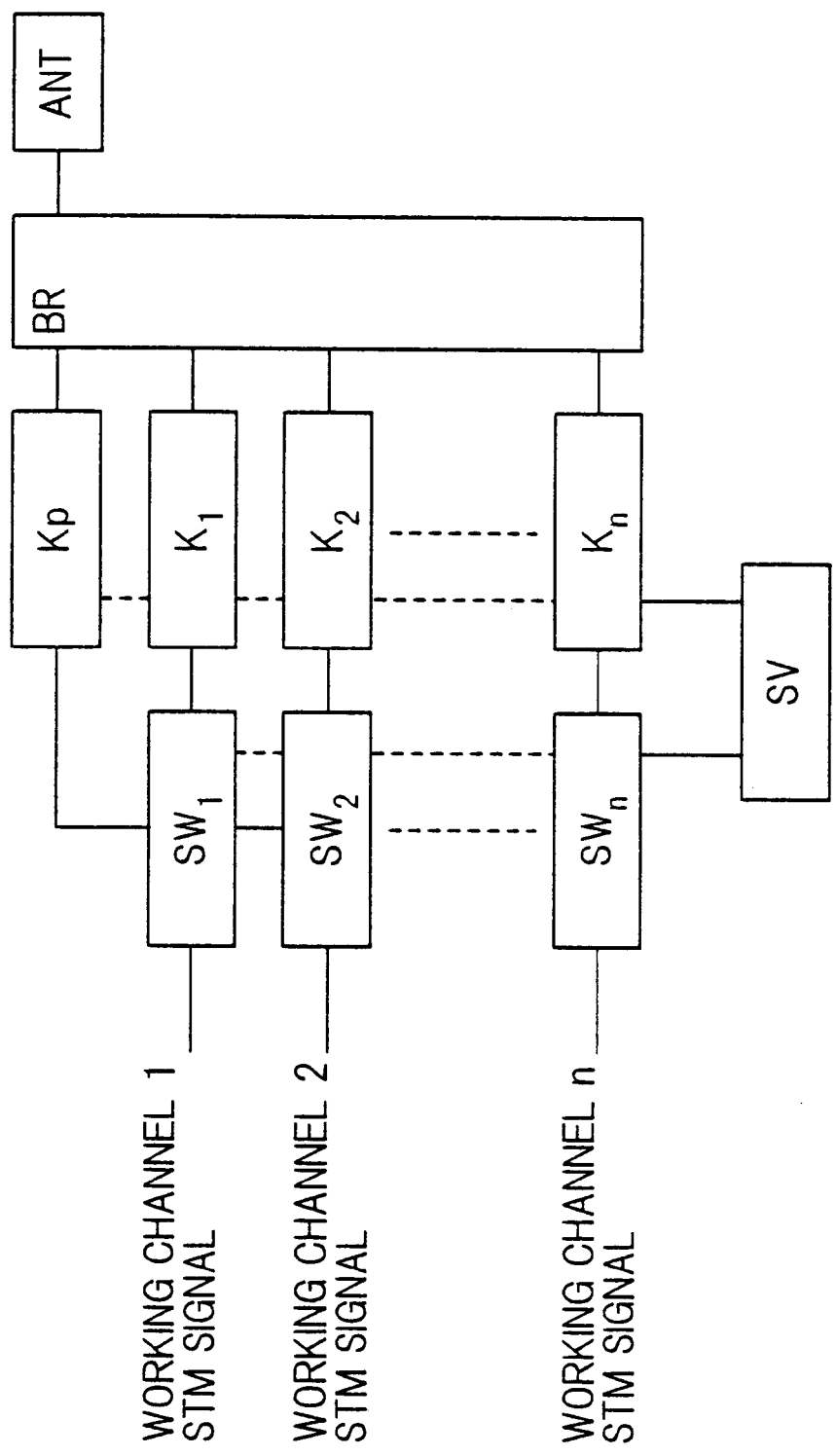
FIG. 27 is a diagram showing another example of a wireless transmission apparatus according to the prior art.
Figure 28:
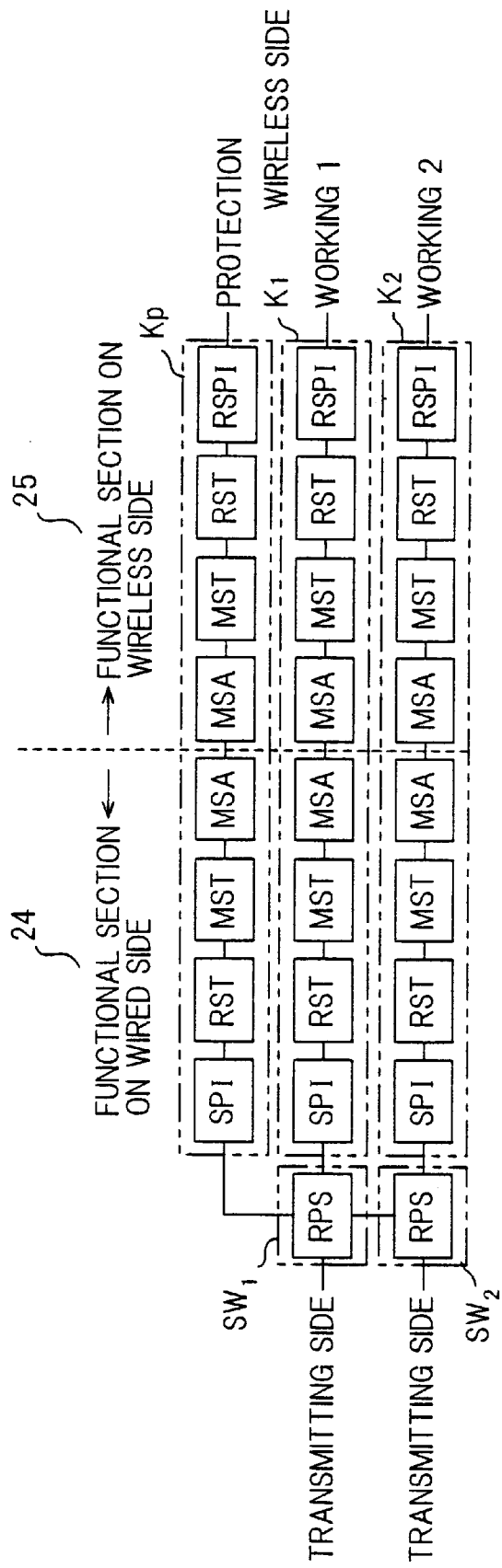
FIG. 28 is a functional block diagram showing the other example of the wireless transmission apparatus according to the prior art.
Figure 29:
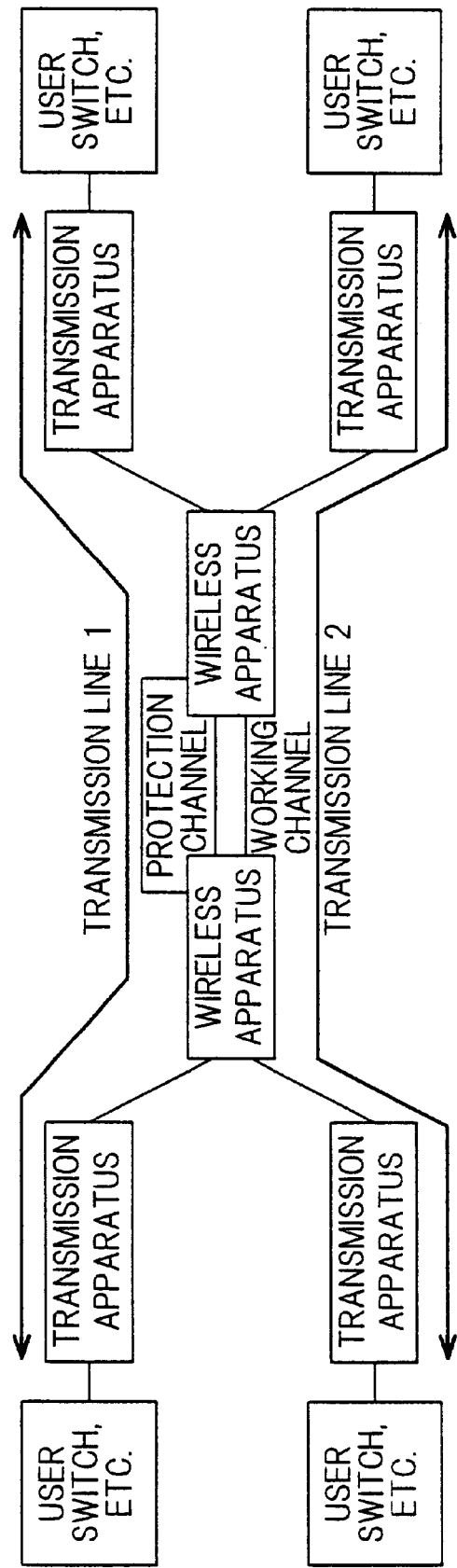
FIG. 29 is a diagram useful in describing status information management based upon working/protection changeover according to the prior art.
Figure 30:
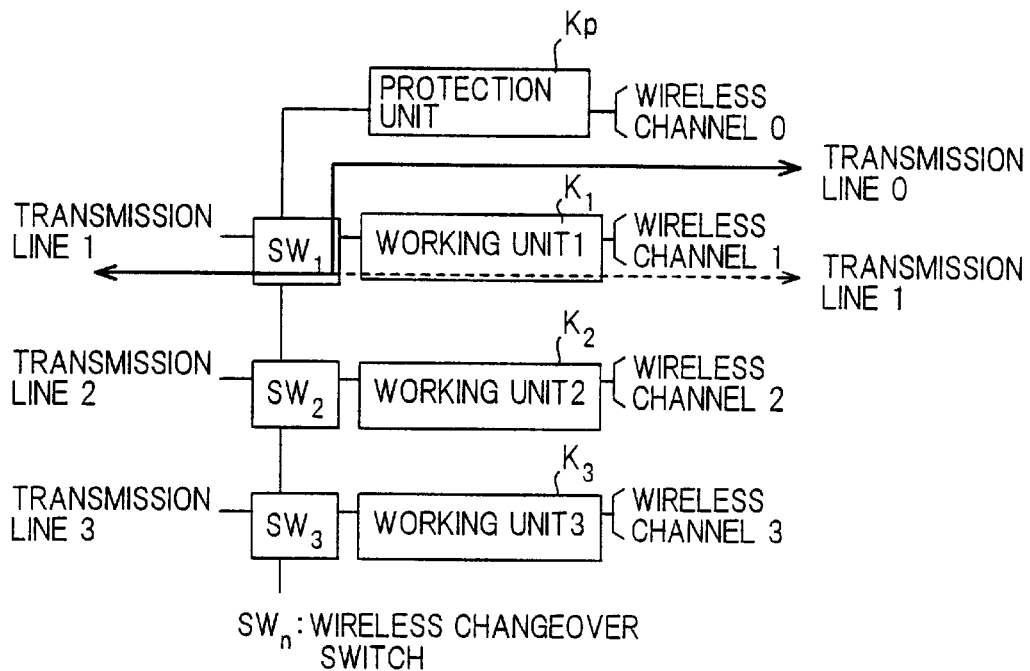
FIG. 30 is a diagram useful in describing working/protection changeover according to the prior art.
Figure 31:
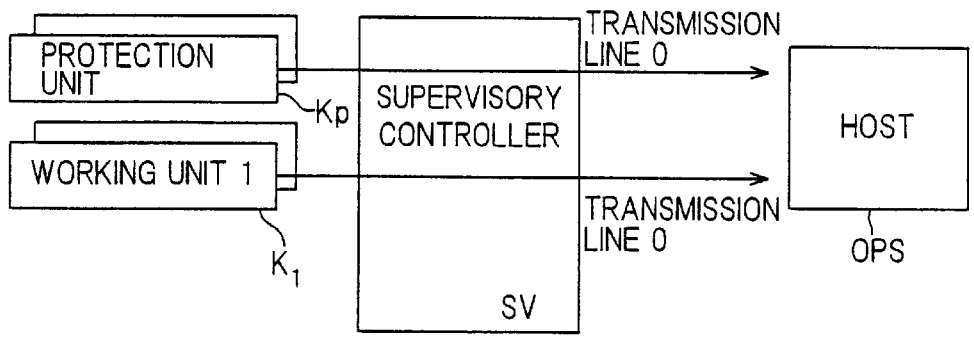
FIG. 31 is a diagram useful in describing correspondence between transmission lines and units according to the prior art.

FIG. 2 is a functional block diagram showing the wireless transmission apparatus of FIG. 1, in which components identical with those shown in FIG. 1 are designated by like reference characters. Numerals 31, 32 denote the functional sections on the wired and wireless sides, respectively. The apparatus includes a radio protection switching RPS on the wired side for switching between working and protection units by controlling the switches $BSW_1$–$BSW_7$ in accordance with predetermined logic, and radio protection switching RPS on the wireless side for switching between working and protection wireless channels by controlling the switches $USW_1$–$USW_7$ in accordance with predetermined logic. The apparatus further includes SDH physical interfaces SPI, regenerator section terminations RST, multiplex section terminations MST, multiplex section adaptations MSA and radio SDH physical interfaces RSPI. The present invention differs from the conventional wireless transmission apparatus (FIGS. 27, 28) in the addition of the hitless changeover switches $USW_i$ and radio protection switching devices RPS on the wireless side.

(b) Construction of unit changeover switch

Figure 3:
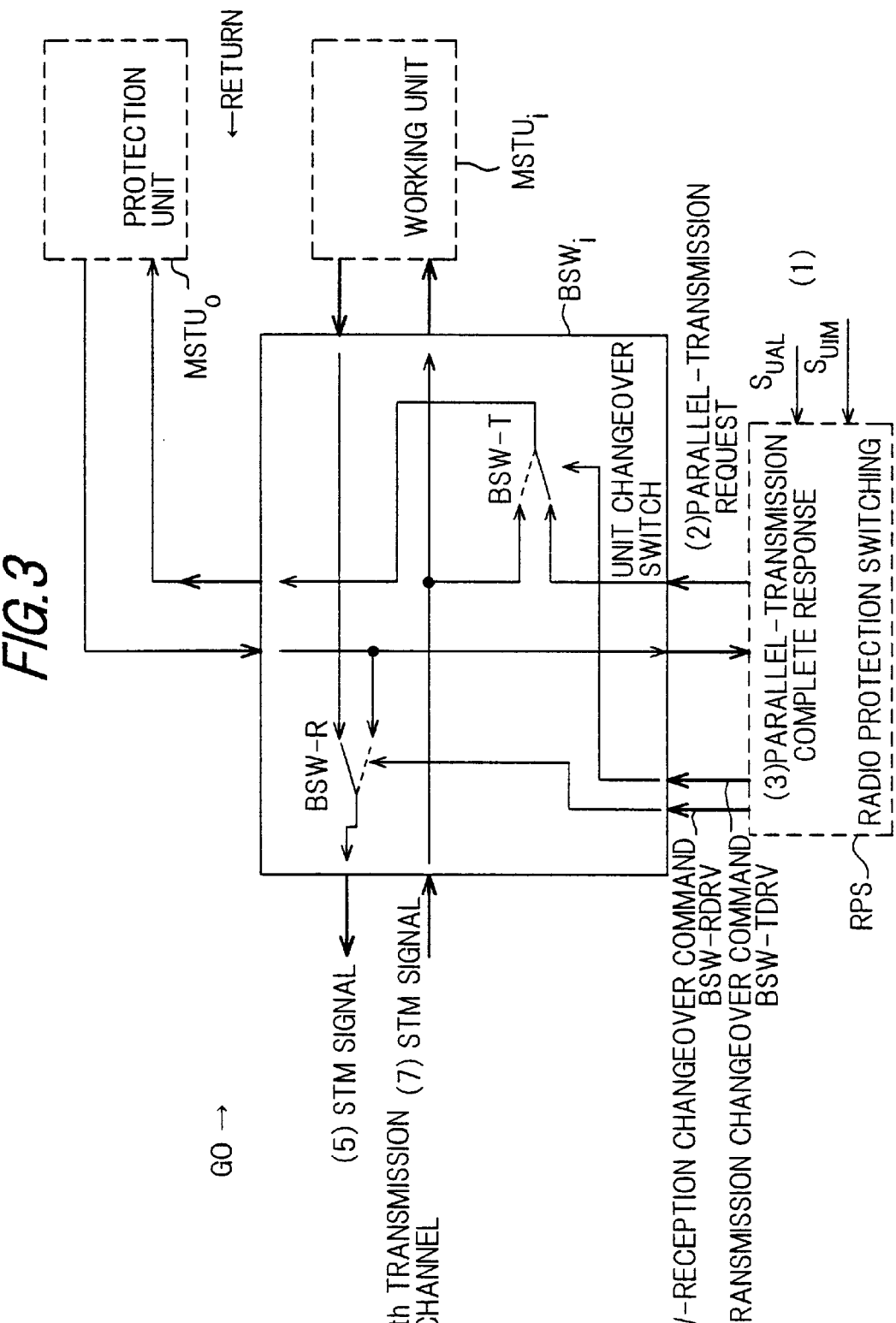
FIG. 3 is a diagram showing the construction of a unit changeover switch.

FIG. 3 is a diagram showing the construction of the unit changeover switch $BSW_i$ (i=1 –n), in which components identical with those shown in FIG. 1 are designated by like reference characters. Shown in FIG. 3 are a working unit $MSTU_i$ of an ith transmission channel, the protection unit MSTU0 and the radio protection switching device RPS. A unit alarm signal $S_{UAL}$ and a unit-packaged signal $S_{UIM}$ enter the radio protection switching device RPS from the working unit $MSTU_i$. The unit changeover switch $BSW_i$ is provided externally of the working unit $MSTU_i$ and, in response to the occurrence of a failure in the unit $MSTU_i$ or non-packaging of the unit $MSTU_i$, switches the unit to the protection unit and, at the same time, performs uplink/downlink bidirectional switching.

The unit changeover switch $BSW_i$ is provided with a switch BSW-R on the receiving side and a switch BSW-T on the transmitting side. Under normal conditions, the unit changeover switch $BSW_i$ is in the position indicated by the solid lines in FIG. 3 so that an STM signal in the uplink (GO) direction passes through the unit changeover switch $BSW_i$ and enters the working unit $MSTU_i$. Further, an STM signal in the downlink (RETURN) direction from the working unit $MSTU_i$ passes through the switch BS-R so as to be sent to the transmission line.

(1) If the unit fails or the unit is in the non-packaged state, (2) the radio protection switching device RPS requests the opposite station (by a parallel transmission request) to send a signal to the working and protection wireless channels simultaneously. (3) The opposite station responds to the parallel transmission request by changing over the transmitting-side switch BSW-T to implement parallel transmission control and then transmitting a parallel-transmission completion response. (4) Upon receiving this response, the radio protection switching device RPS outputs a BSW-reception changeover command to change the reception switch BSW-R over to the side of the dashed line. (5) The signal sent from the protection channel by parallel transmission is received via the protection unit $MSTU_0$ and sent to the ith transmission channel. (6) After the above-mentioned response is received, the transmitting switch BSW-T is changed over to the side of the dashed line by a BSW-transmission changeover command and (7) the STM signal that enters from the ith transmission channel is transmitted in parallel to the working and protection wireless channels. Thereafter, an answer/changeover signal is sent to the opposite station. As a result, the opposite station changes over its receiving switch, receives the signal from the protection channel and sends the signal to the transmission line.

(c) Construction of hitless changeover switch

Figure 4:
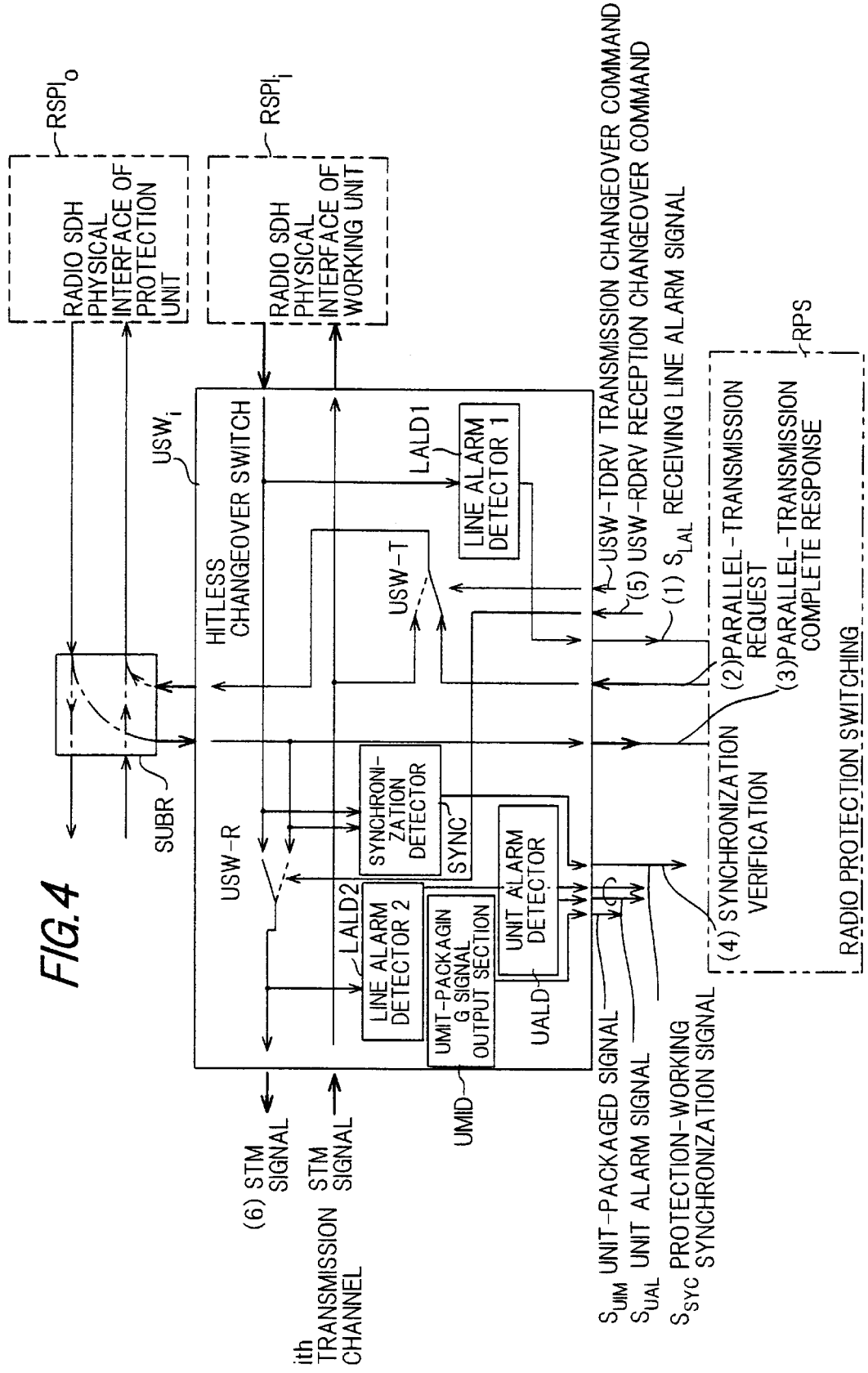
FIG. 4 is a diagram showing the construction of a changeover switch for switching without instantaneous disconnection.

FIG. 4 is a diagram showing the construction of the hitless changeover switch $USW_i$ (i=1–n). Components identical with those shown in FIGS. 1 and 2 are designated by like reference characters. Shown in FIG. 4 are a radio SDH physical interface $RSPI_i$ of the working unit, a radio SDH physical interface $RSPI_0$ of the protection unit, the combining brancher SUBR of the protection unit, the radio protection switching device RPS and the hitless changeover switch $USW_i$.

The hitless changeover switch $USW_i$ includes a receiving hitless changeover switch USW-R; a transmitting hitless changeover switch USW-T; a first line alarm detector LALD1 for detecting failure in a receiving wireless channel and inputting a receiving line alarm signal $S_{LAL}$ to the radio protection switching device RPS; a unit alarm detector UALD for detecting failure in the unit and inputting the unit alarm signal $S_{UAL}$ to the radio protection switching device RPS; a unit-packaged signal output section UMID for inputting the unit-packaged signal $S_{UIM}$, which indicates that the unit has been packaged in the apparatus, to the radio protection switching device RPS; a synchronization detector SYNC for detecting synchronization of the working and protection signals and outputting a protection-working synchronization signal $S_{SYC}$; and a second line alarm detector LALD2, which is provided downstream of the receiving hitless changeover switch USW-R, for detecting line failure after unidirectional hitless switching and inputting the unit alarm signal $S_{UAL}$ to the radio protection switching device RPS.

Under normal conditions, the receiving hitless changeover switch USW-R and transmitting hitless changeover switch USW-T are both in the positions indicated by the solid lines in FIG. 4. Accordingly, the signal in the downlink (RETURN) direction sent from the opposite station via the radio SDH physical interface RSPIi is transmitted by being passed through the receiving hitless changeover switch USW-R. The STM signal in the uplink (GO) direction is sent to the opposite station via the radio SDH physical interface $RSPI_i$ by being passed through the hitless changeover switch $USW_i$ irrespective of switch changeover. Further, the radio protection switching device RPS is capable of communicating with the radio protection switching device RPS of the opposite station via the radio SDH physical interface $RSPI_0$ and wireless protection channel or another working channel.

(1) If a failure develops in a wireless channel in the downlink (RETURN) direction under these conditions, the first line alarm detector LALD1 detects the failure and inputs the receiving line alarm signal $S_{LAL}$ to the radio protection switching device RPS. (2) Upon receiving the receiving line alarm signal $S_{LAL}$, the radio protection switching device RPS requests the opposite station (issues a parallel transmission request) to transmit a signal to the working and protection wireless channels simultaneously. (3) The opposite station responds to the parallel transmission request by implementing parallel transmission control and then transmitting a parallel-transmission completion response. (4) Upon receiving this response, the radio protection switching device RPS verifies (performs verification of synchronization) the synchronization of the working and protection signals based upon the protection-working synchronization signal $S_{SYC}$ output by the synchronization detector SYNC and (5) outputs a USW-reception changeover command to change the receiving changeover switch USW-R over to the side of the dashed line (i.e., to drive the receiving changeover switch). (6) The signal sent from the protection channel by parallel transmission is received via the radio SDH physical interface $RSPI_0$ and combining brancher SUBR and sent to the ith transmission channel. (This represents completion of unidirectional switching)

(d) Radio protection switching device RPS

Figure 5:
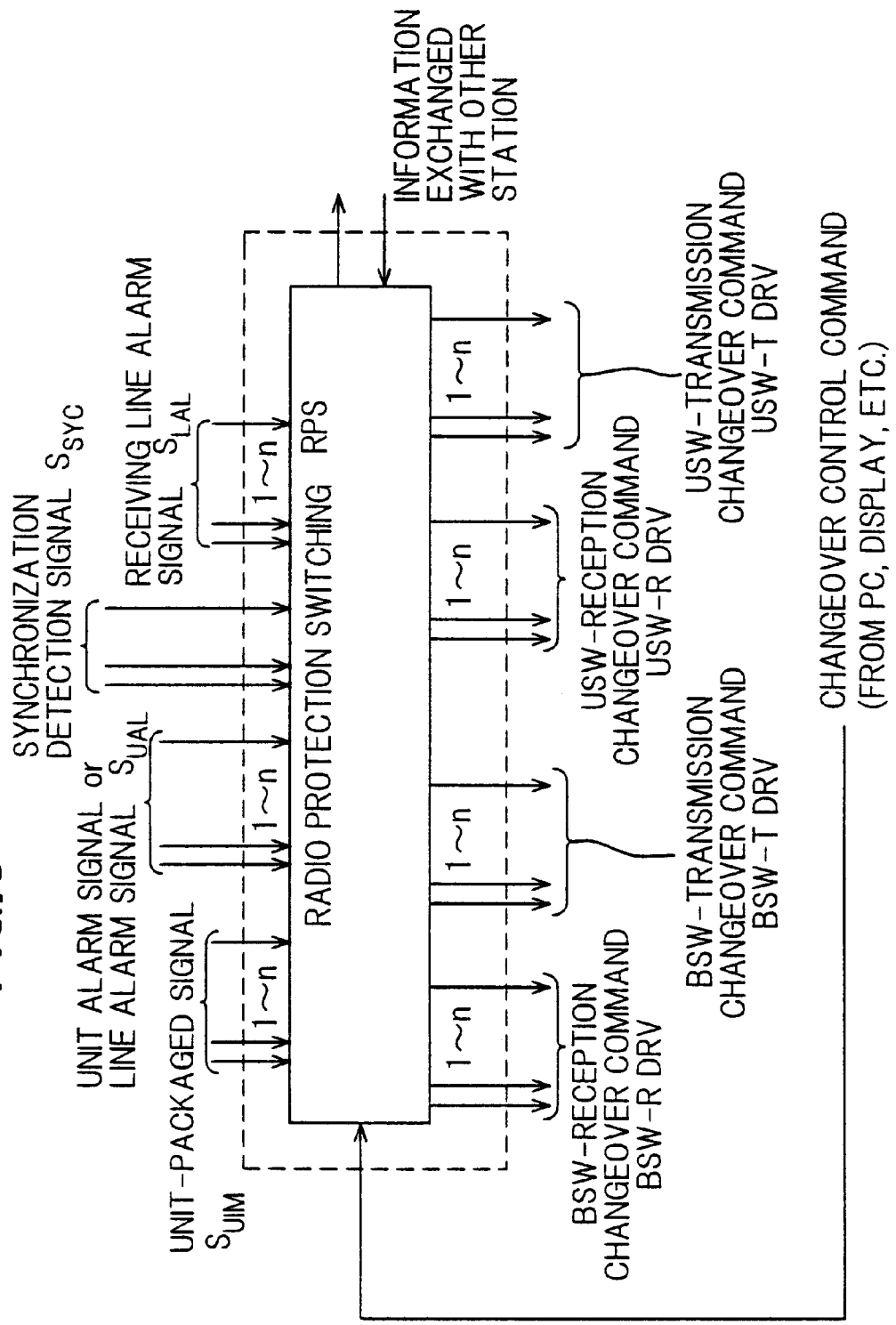
FIG. 5 is a diagram useful in describing various input/output signals in radio protection switching.

FIG. 5 is a diagram for describing signals input to and output from the radio protection switching device RPS. Signals that enter the radio protection switching device RPS are (1) the unit-packaged signal $S_{UIM}$, (2) the unit alarm signal $S_{UAL}$, (3) the synchronization detection signal $S_{SYC}$ and (4) the receiving line alarm signal $S_{LAL}$. These signals enters from all of the working units $MSTU_1$–$MSTU_7$. The signals output from the radio protection switching device RPS are (1) a BSW-reception changeover command signal BSW-RDRV, (2) a BSW-transmission changeover command signal BSW-TDRV, (3) a USW-reception changeover command signal USW-RDRV and (4) a USW-transmission changeover command signal USW-TDRV. The radio protection switching device RPS outputs these signals to each of the working units $MSTU_1$–$MSTU_7$. Further, signals are exchanged with the radio protection switching device RPS of the opposite station. The sending/receiving of these signals is carried out via the protection wireless channel or another working channel. Furthermore, changeover control command signals also enter from a personal computer or external display.

(e) Switching sequence of unit changeover switch BSW

Figure 6:
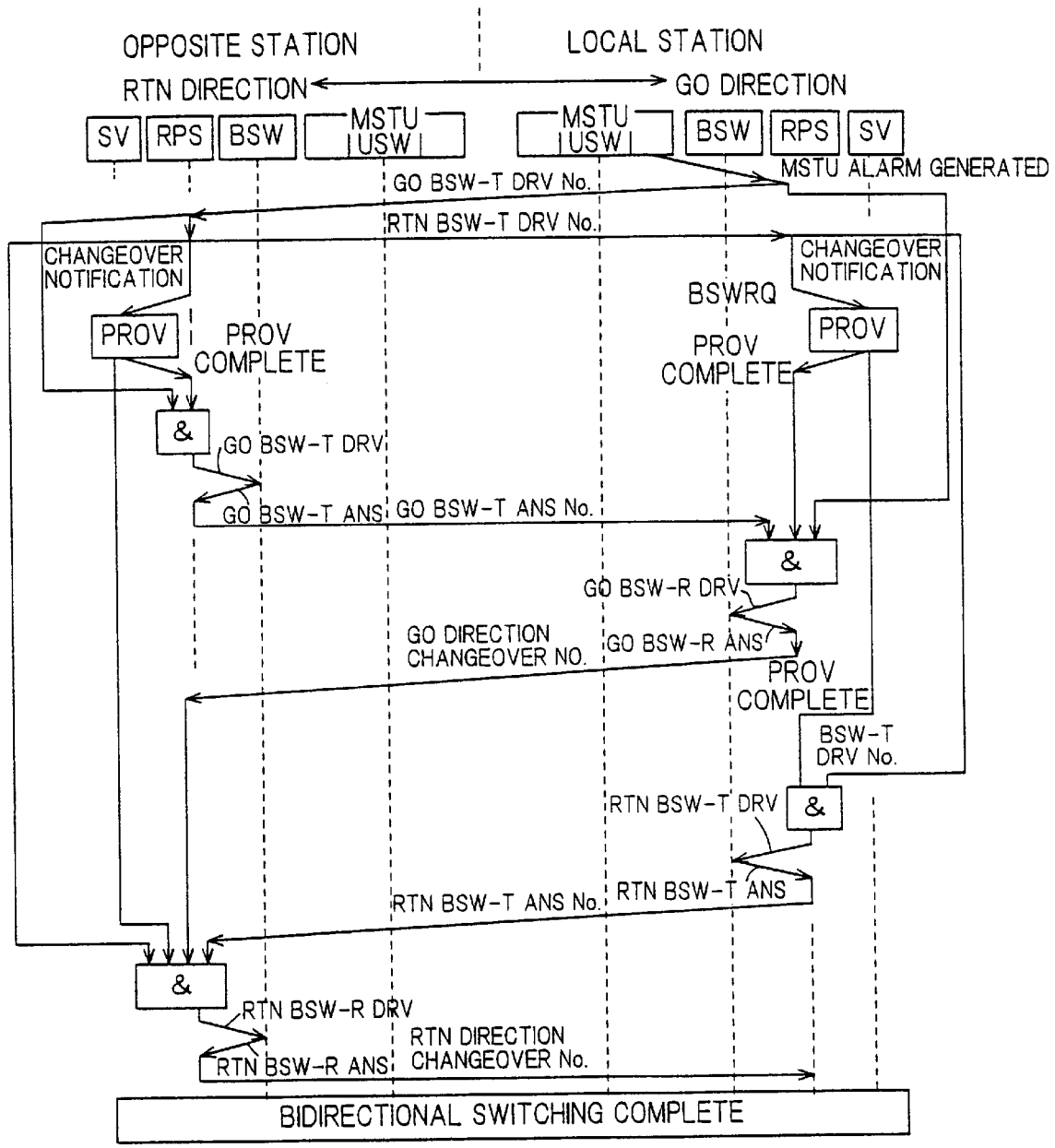
FIG. 6 is a diagram useful in describing the switching sequence of a BSW switch.

FIG. 6 illustrates the sequence of switching in both directions between a local station and opposite station in a case where an MSTU alarm (unit alarm) has been generated within a unit of the local station.

In FIG. 6, BSW-TDRV NO. represents a request to the opposite station to changeover the transmitting switch, and PROV represents processing for copying setting information from a working unit to the protection unit. After copy processing is completed (PROV complete), control for changing over the transmitting/receiving switches BSW-R, BSW-T of the local and opposite stations becomes possible. The symbol "&" represents AND processing. When each input condition of the logical product is established, processing is capable of being executed. Further, BSW-TDRV represents a command for changeover of the transmitting switch of the local station, BSW-TANS a transmitting-switch changeover complete response, BSW-TANS NO. a transmitting-switch changeover complete response to the opposite station, BSW-RDRV a command for changeover of the receiving switch of the local station, and BSW-RANS a receiving-switch changeover complete response.

If unit failure (an MSTU alarm) occurs in the working unit of the ith transmission channel, the radio protection switching device RPS of the local station (first station) sends the parallel transmission request (transmitting-switch changeover request BSW-TDRV NO.) to the opposite station. Upon receiving this parallel transmission request, the radio protection switching device RPS of the opposite station (second station) inputs changeover notification to the supervisory controller SV and sends the parallel transmission request (transmitting-switch changeover request BSW-TDRV NO.) back to the communicating station. The first station responds to this parallel transmission request by inputting changeover notification to the supervisory controller SV of its own station.

By virtue of the foregoing operation, the supervisory controller SV of each station copies the setting information, which has been set in a working unit of the ith transmission channel, to the protection unit and output a PROV complete signal. (This represents PROV processing.)

In response to completion of copying of the setting information (i.e., in response to PROV completion), the radio protection switching device RPS of the opposite station (second station) drives the transmitting switch BSW-T to establish the parallel transmission state and notifies the opposite station (first station) of completion of transmitting switch changeover (completion of parallel transmission). In response to this parallel-transmission complete signal (GO BSW-T ANS. NO.), the radio protection switching device RPS of the first station that issued the parallel transmission request changes over the receiving switch BSW-R of its own station. By virtue of this operation, the first station subsequently receives the uplink signal (the signal in the GO direction) from the opposite station via the protection unit.

In parallel with the above-described processing, the local station (first station), in response to generation of the PROV complete signal, changes over the transmitting switch BSW-T to establish the parallel transmission state with respect to the downlink (RETURN) direction, and sends the opposite station the changeover complete signal (parallel-transmission complete signal) RTN BSW-TANS NO. of the transmitting switch BSW-T. Accordingly, the radio protection switching device RPS of the opposite station (second station) changes over the receiving switch BSW-R. As a result, the first station transmits the downlink signal (the signal in the RETURN direction) to the opposite station via the protection unit, and the opposite station receives the signal via the protection channel.

(f) Switching sequence of hitless switching switch USW

Figure 7:
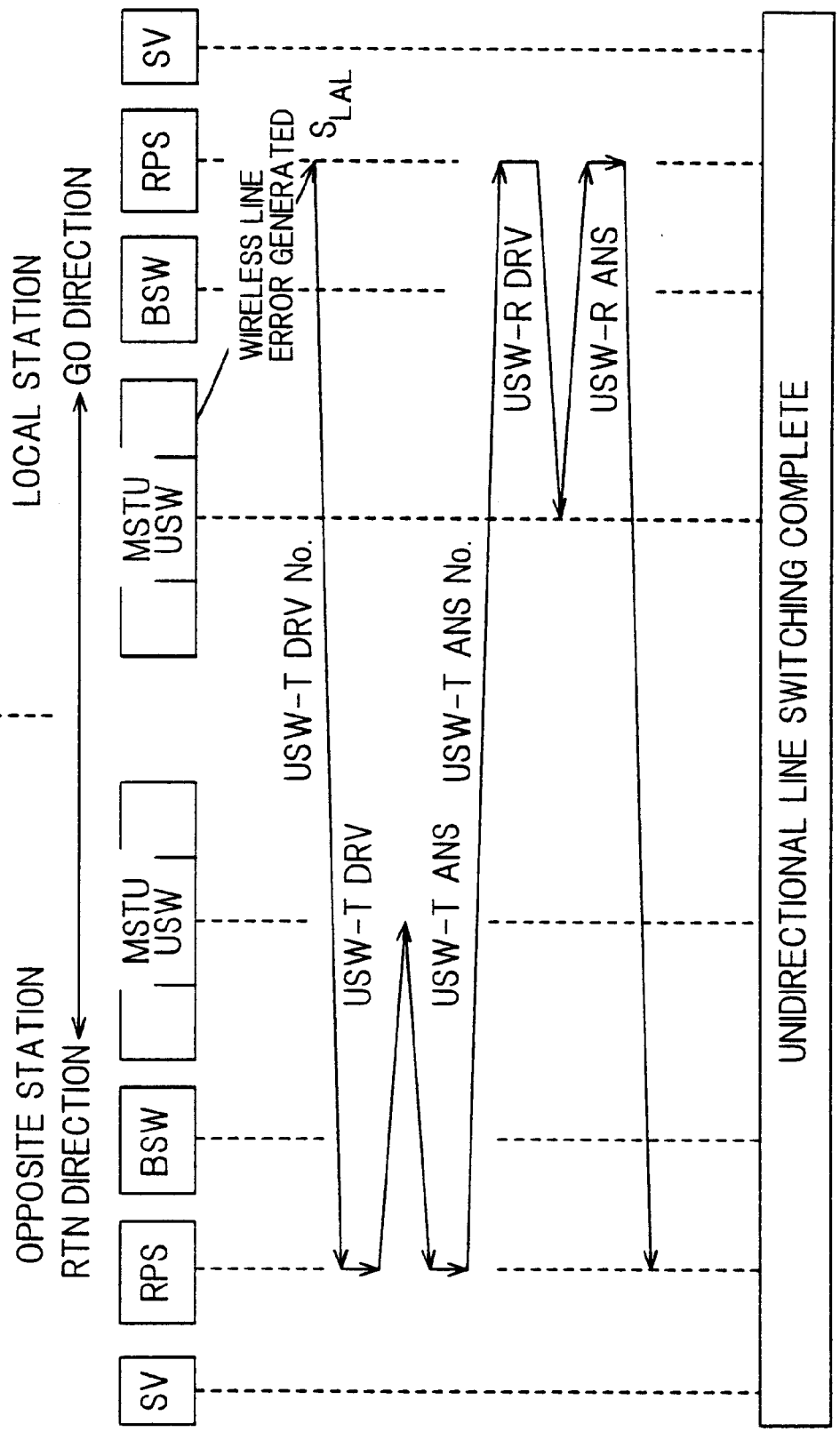
FIG. 7 is a diagram useful in describing the switching sequence of a USW switch.

FIG. 7 illustrates the sequence of switching in one direction between a local station and opposite station in a case where a failure has occurred in a receiving wireless channel.

In FIG. 7, USW-TDRV NO. represents a request to the opposite station to changeover the transmitting changeover switch, USW-TDRV a command to changeover the transmitting changeover switch, USW-TANS a transmitting-switch changeover complete response, USW-TANS NO. a transmitting-switch changeover complete response to the opposite station, USW-RDRV a command for changeover of the receiving switch of the local station, and USW-RANS a receiving-switch changeover complete response.

If a failure occurs in a wireless channel in the downlink (RETURN) direction, the radio protection switching device RPS sends the parallel transmission request (transmitting-switch changeover request USW-TDRV NO.) to the opposite station. Upon receiving this parallel transmission request, the radio protection switching device RPS of the opposite station drives the transmitting changeover switch USW-T to establish parallel transmission and sends the opposite station the signal USW-TANS NO. representing completion of transmitting switch changeover (completion of parallel transmission). In response to this changeover complete signal (USW-T ANS NO.), the radio protection switching device RPS of the station that issued the parallel transmission request changes over the receiving changeover switch USW-R of its own station. By virtue of this operation, the RETURN signal from the opposite station is received via the protection unit.

(g) Sequence at occurrence of channel failure after hitless switching

Figure 8:
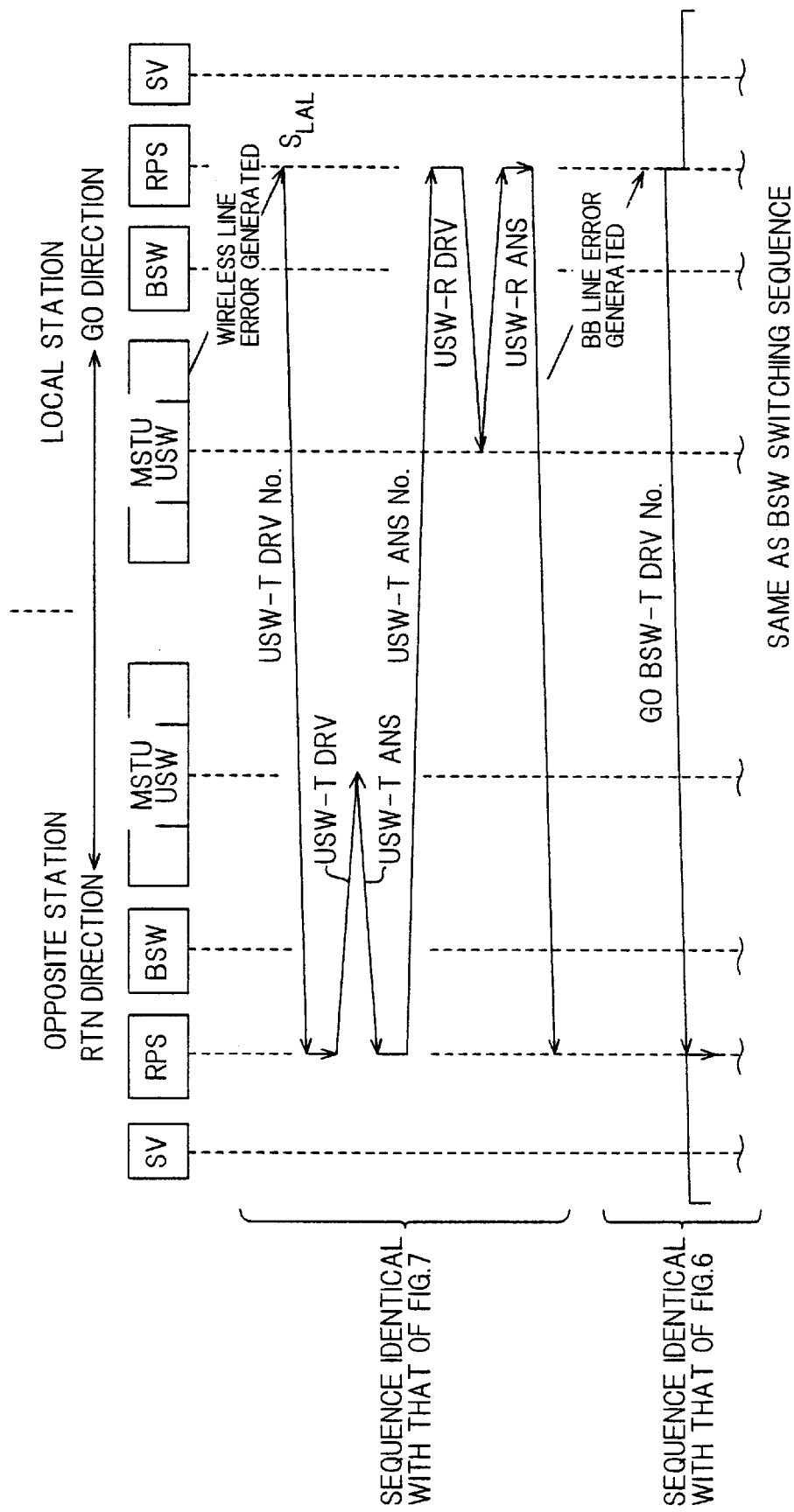
FIG. 8 is a diagram useful in describing a sequence implemented at occurrence of an error in a BB line after USW switch changeover.

FIG. 8 is a diagram useful in describing a sequence executed at occurrence of BB line failure after hitless switching.

In response to failure in a wireless channel, the receiving changeover switch USW-R (see FIG. 4) is changed over without instantaneous disconnection upon synchronizing the working and protection signals in accordance with the sequence of FIG. 7.

If the second line alarm detector LALD2 subsequently detects a line alarm (baseband line alarm), the radio protection switching device RPS regards this as the occurrence of a failure within the working unit and executes the BSW switching sequence shown in FIG. 6. More specifically, if a BB line failure occurs after synchronous switching due to failure in a wireless channel, the radio protection switching device RPS construes that a failure has developed in the working unit and controls the unit changeover switch to perform the changeover between the working and protection units, thereby allowing communication to continue.

(i) Actions and effects of first embodiment

In accordance with the first embodiment described above, it is possible to perform (1) unidirectional hitless switching at occurrence of an error in a wireless channel, and (2) bidirectional switching owing to unit changeover when a unit fails or when a unit has not been packaged.

Further, in a case where BB line failure has been detected after USW hitless switching, a failure is construed to have occurred within the unit and BSW unit changeover is carried so that communication can be continued.

Further, by performing changeover in two directions automatically and simultaneously by the unit changeover switch BSW, it is possible to eliminate erroneous operation that occurs in the prior art, namely a situation in which a unit is replaced when changeover has been performed in only one direction.

Further, it is possible to use changeover switches selectively as by performing BSW changeover when a seldom utilized unit is replaced and USW changeover at the time of the more frequent decline in line quality, an example of the latter being fading.

Further, by performing USW unidirectional switching at the time of such frequently occurring line quality degradation, the protection channel in the opposite direction can be left idle and utilized for relief of other lines.

Further, by implementing automatic changeover when a unit fails, the unit can be changed over not only at the time of maintenance but also automatically at the time of abnormal operation.

(B) Embodiment in which identifiers are made identical

Figure 25:
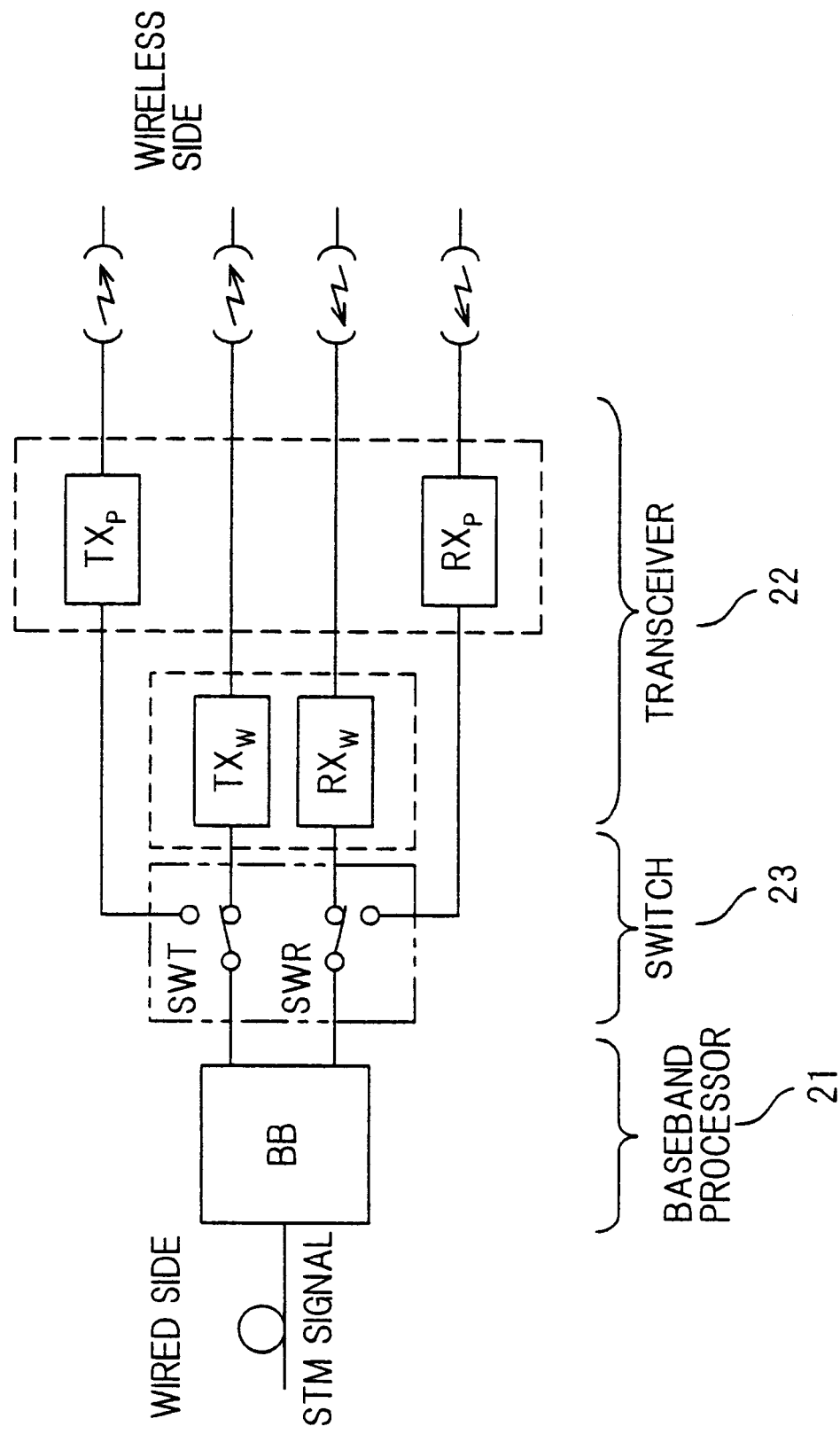
FIG. 25 is a diagram showing the construction of a wireless transmission apparatus according to the prior art.
Figure 26:
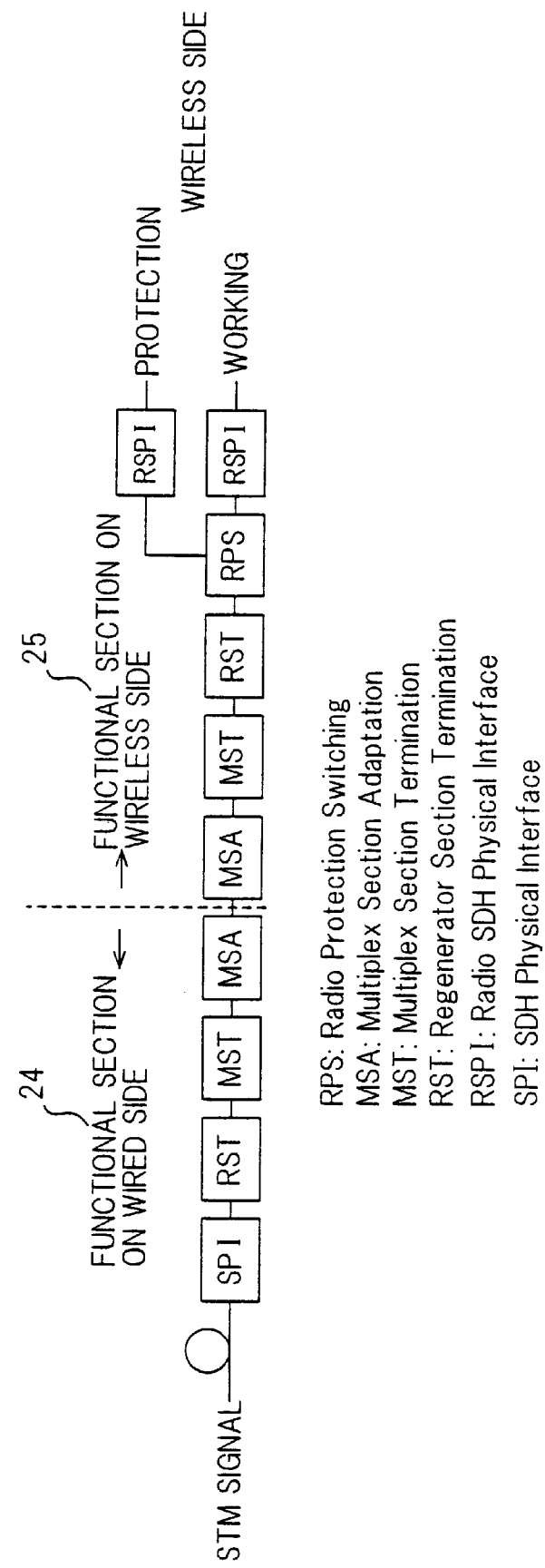
FIG. 26 is a functional block diagram of a wireless transmission apparatus according to the prior art.

With the first wireless transmission apparatus according to the prior art shown in FIGS. 25 and 26, the wireless transceiving unit and SDH baseband processing unit are separated from each other and the changeover between working and protection wireless channels is carried out starting from the regenerator section termination RST on the wireless side in terms of the function blocks. Consequently, the status information of each section (MSA, MST, RST) constituting the transmission path is always appended to the same identifier (which is for identifying the transmission path) irrespective of wireless switching, after which the information is sent to the host device. By contrast, with the second wireless transmission apparatus according to the prior art shown in FIGS. 27 and 28, the wireless transceiving unit and SDH baseband processing unit are unified and the changeover between working and protection wireless channels is carried out externally of the SDH physical interface SPI on the wired side in terms of the function blocks. Consequently, the unit that is the origin of the status information of each section (MSA, MST, RST) constituting the transmission path is changed by wireless switching, different identifiers (one before switching and one after switching) are appended to the information and the information is sent to the host device. The result is troublesome status management.

When a network is supervised, a transmission line can be regarded as a single end-to-end pipe without taking into account the transmission medium, and even if unit changeover is performed within a wireless apparatus, data flows through the same path as far as the network is concerned. Accordingly, if identifiers appended to status information can be made the same, even though working/ protection unit changeover is performed within a wireless transmission apparatus, management will be facilitated.

(a) Overall construction

Figure 9:
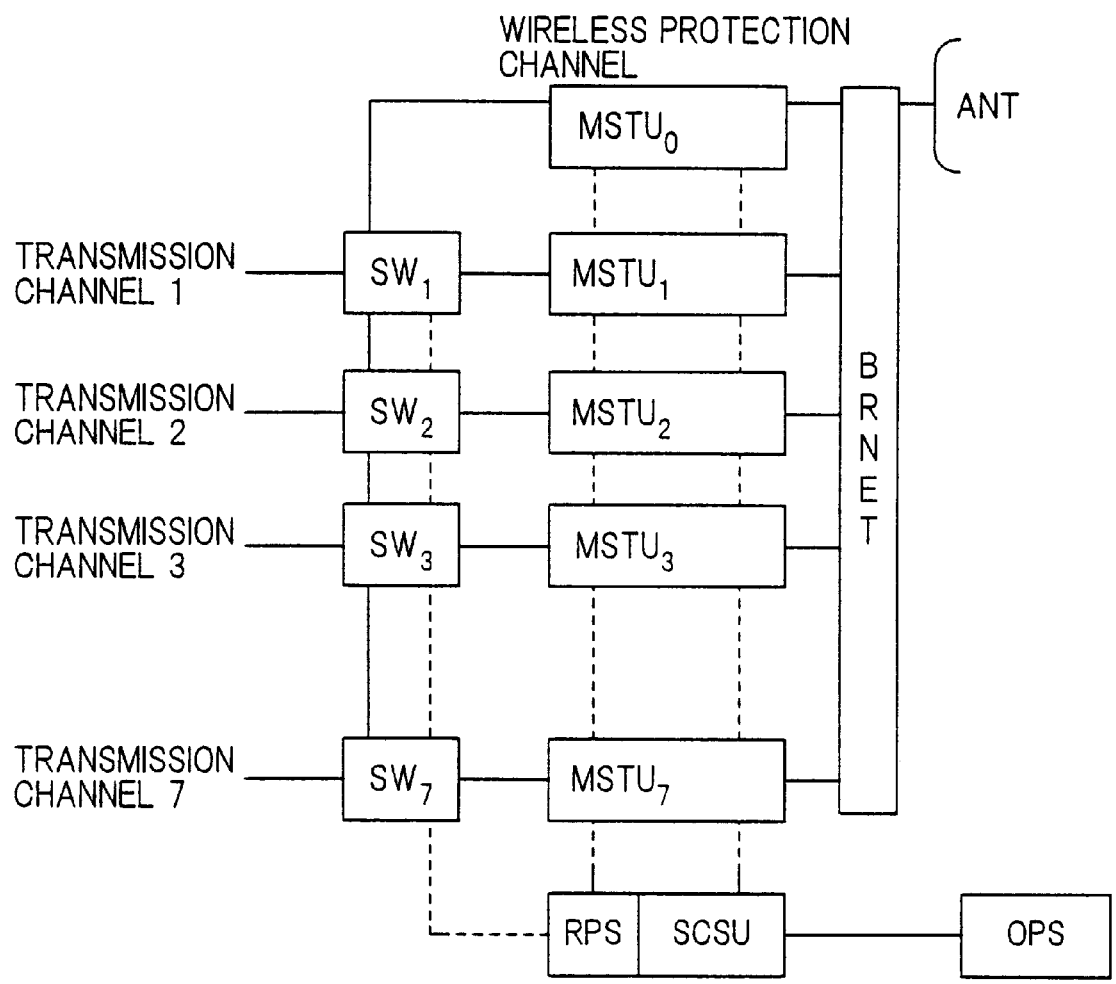
FIG. 9 is a block diagram of a wireless transmission apparatus according to a second embodiment in which identifiers are made the same even when a changeover is made between working and protection units.

FIG. 9 is a block diagram of an SDH wireless transmission apparatus in which identifiers appended to status information can be made identical even when a changeover is made between working and protection units. The apparatus includes the units $MSTU_0$–$MSTU_7$ each obtained by unifying a baseband processor, a modulator/demodulator and a wireless transceiver. Units $MSTU_1$–$MSTU_n$ are working units provided for corresponding ones of transmission channels 1–n, and the unit $MSTU_0$ is a protection unit provided for standby. The apparatus further includes the receiving filter & antenna duplexer BRNET; the antenna ANT; changeover switches $SW_1$–$SW_7$ provided externally of the working units $MSTU_1$–$MSTU_n$, respectively, for changing over between working and protection units; and the radio protection switching device RPS, which is connected to the changeover switches $SW_1$–$SW_7$ and units $MSTU_0$–$MSTU_7$. When a fails or when a unit has not been packaged with the apparatus, the radio protection switching device RPS performs a unit working/protection changeover by controlling the switches $SW_1$–$SW_7$ in accordance with predetermined logic. For example, when a failure requiring changeover of the working unit $MSTU_1$ occurs, the radio protection switching device RPS controls the changeover switch $SW_1$ to switch between the working unit $MSTU_1$ and the protection unit $MSTU_0$.

The apparatus further includes the setting/supervisory controller SCSU and a host device OPS. The setting/ supervisory controller SCSU (1) receives setting information/control information from the host device OPS and inputs the information to a prescribed unit and to the radio protection switching device RPS, and (2) acquires the status of each of the units $MSTU_0$–$MSTU_7$, attaches the identifier of the transmission channel (transmission line) to which the unit belongs to the acquired information and then notifies the host device OPS. Further, (3) upon being notified by the radio protection switching device RPS of working/ protection unit changeover, the setting/supervisory controller SCSU performs control in such a manner that the identifier attached to the status information will not be changed by the unit changeover. In other words, upon being notified by the radio protection switching device RPS of completion of the changeover to the protection unit, the setting/supervisory controller SCSU executes processing in such a manner that the status information acquired from the protection unit is communicated to the host device OPS as information of the same transmission channel that prevailed before the changeover. As a result, even though unit changeover occurs, the channel information of which the host device OPS is notified is the same name (identifier), as far as the host device OPS is concerned. This means that network supervision can be performed without being aware of wireless switching.

The host device OPS supervises and controls the overall transmission system by setting or changing various information, such as methods of using section overhead SOH, in the setting/supervisory controller SCSU, and accepting status information from the setting/supervisory controller SCSU.

(b) Construction of working/protection unit

Figure 10:
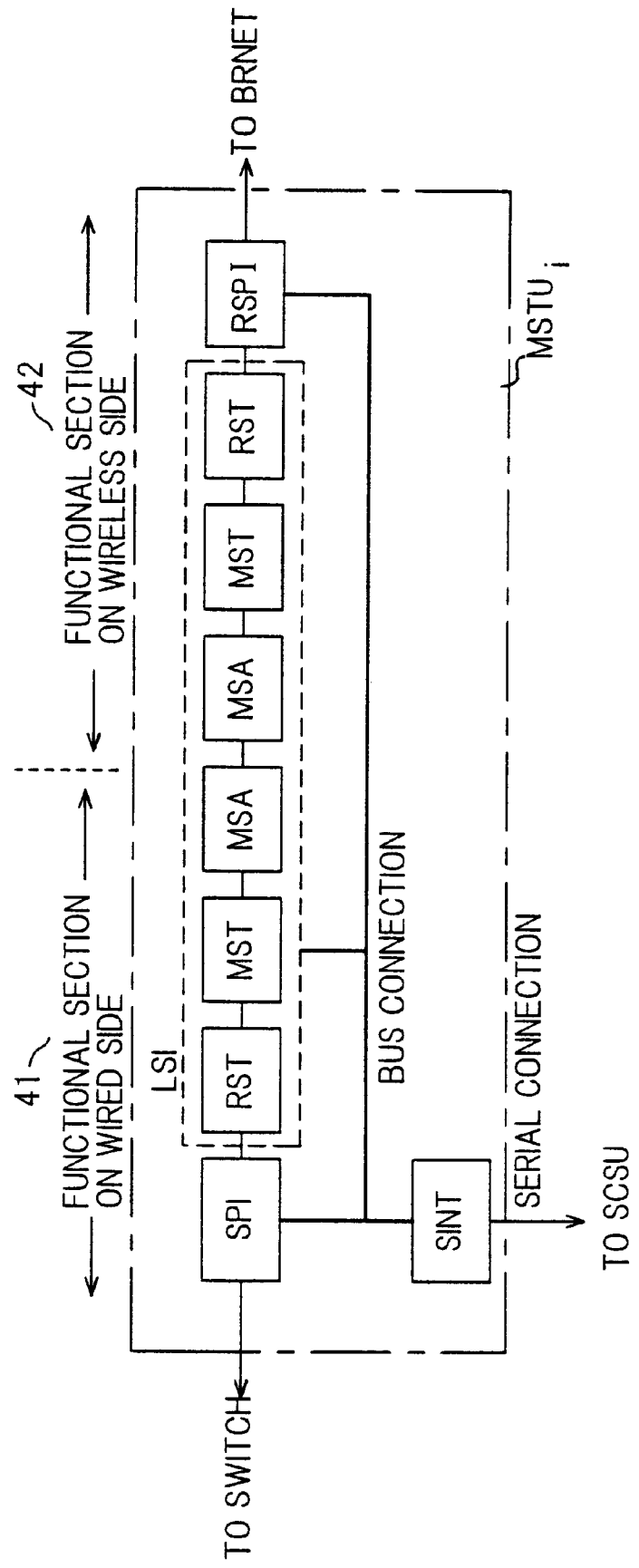
FIG. 10 is a block diagram showing the construction of a unit according to the second embodiment.

FIG. 10 is a block diagram showing the construction of a working/protection unit $MSTU_i$ (i=1–7). Numerals 41, 42 denote the functional sections on the wired and wireless sides, respectively. Each functional section includes an SDH physical interface SPI, a regenerator section termination RST, a multiplex section termination MST, and a multiplex section adaptation MSA. RSPI denotes a radio SDH physical interface. A serial interface SINT, which sends and receives information to and from the setting/supervisory controller SCSU in accordance with a serial interface, is connected to each of the above-mentioned components by a bus.

(c) Construction of setting/supervisory control unit

Figure 11:
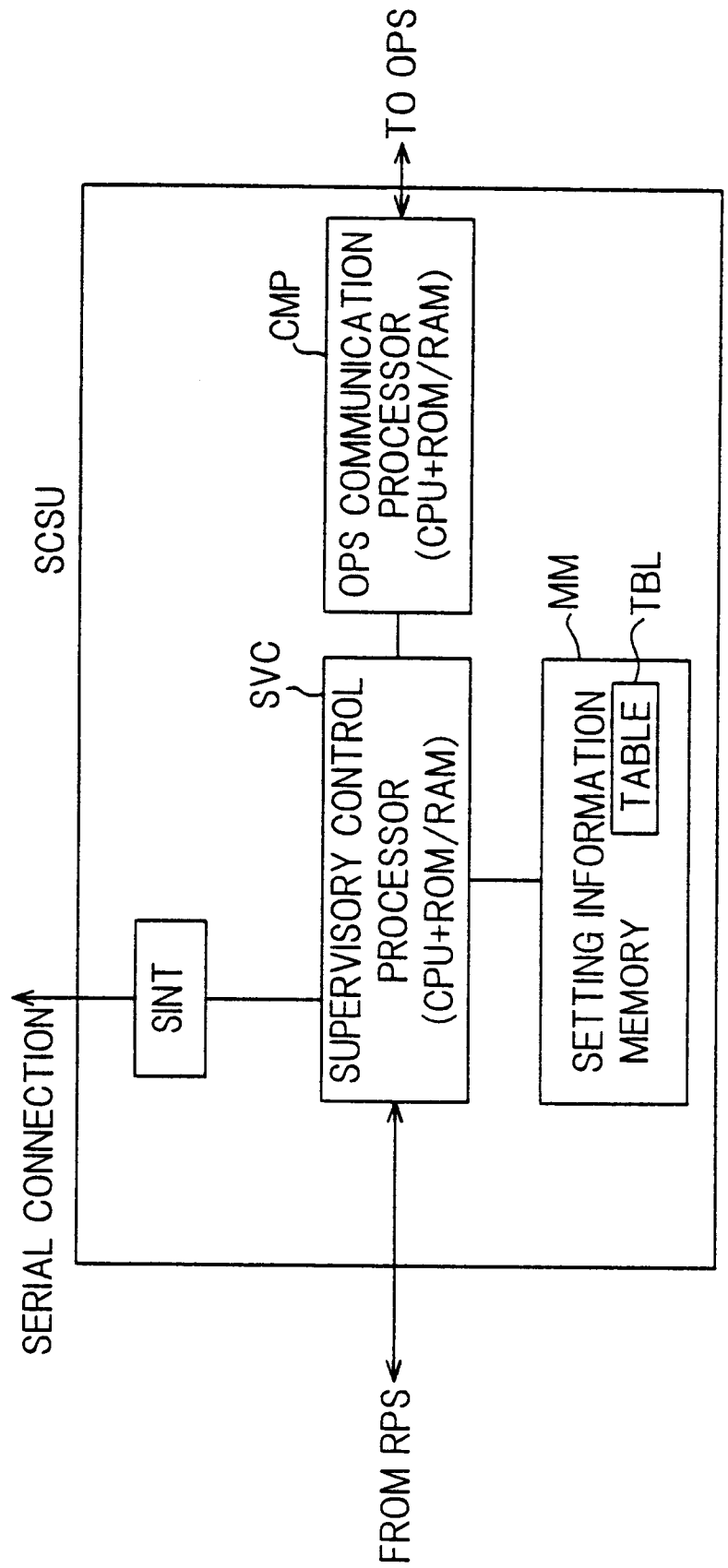
FIG. 11 is a block diagram showing the construction of a setting/supervisory controller.

FIG. 11 is a block diagram showing the construction of the setting/supervisory controller SCSU. The setting/ supervisory controller SCSU includes a serial interface SINT, a supervisory control processor SVC for performing setting/supervisory control, a communication processor CMP, which is implemented by a microcontroller, for controlling communication with the host device OPS, and a memory MM. The latter stores setting information, which has been set in each unit $MSTU_i$ (i=1–7) from the host device OPS, status information acquired from each unit and a table TBL for so arranging it that an identifier is not changed by unit changeover. The serial interface SINT sends and receives information to and from each unit in accordance with a serial interface.

The supervisory control processor SVC, which is constituted by a microcontroller having a CPU, ROM and RAM, executes (1) control for inputting setting information/control information, which has been received from the host device, to a prescribed unit and to the radio protection switching device RPS, (2) control for acquiring status information from each unit and changeover switch, (3) control implemented in such a manner that an identifier added onto status information will not change when a changeover is made between working and protection units, (4) control for adding an identifier onto acquired information and transmitting the information to the host device OPS, and (5) for copying setting information of a working unit to the protection unit when a changeover is made between working and protection units.

(d) Table

FIGS. 12A, 12B are diagrams for describing the table. The table stores the correspondence between identifiers for identifying transmission channels (transmission lines) and I/O addresses of units which acquire status information from each of the transmission channels. In a state in which a unit changeover has not been made (see FIG. 12A), I/O addresses of the working units $MSTU_1$–$MSTU_7$ are stored as status-information acquisition addresses of the transmission channels 1–7 in correspondence with identifiers IL1–IL7 of the transmission channels 1–7, respectively. Accordingly, the supervisory control processor SVC refers to the table, acquires the status information from each of the units $MSTU_1$–$MSTU_7$, attaches the corresponding identifiers IL1–IL7 and transmits the information to the host device OPS.

If the working unit $MSTU_3$ fails and a changeover is made from the working unit $MSTU_3$ to the protection unit $MSTU_0$ under these conditions, the content of the table TBL is updated in the manner shown in FIG. 12B. Specifically, the I/O address of the protection unit is stored in correspondence with the identifier IL3 of transmission channel 3. As a result, the supervisory control processor SVC subsequently acquires the status information of transmission channel 3 from the protection unit $MSTU_0$, appends the corresponding identifier IL3 and transmits the information to the host device OPS. In other words, even when a changeover from a working unit to the protection unit is performed, the identifier attached to the status information acquired from the working unit before the changeover and the identifier attached to the status information acquired from the protection unit after the changeover can be made the same.

Figure 13:
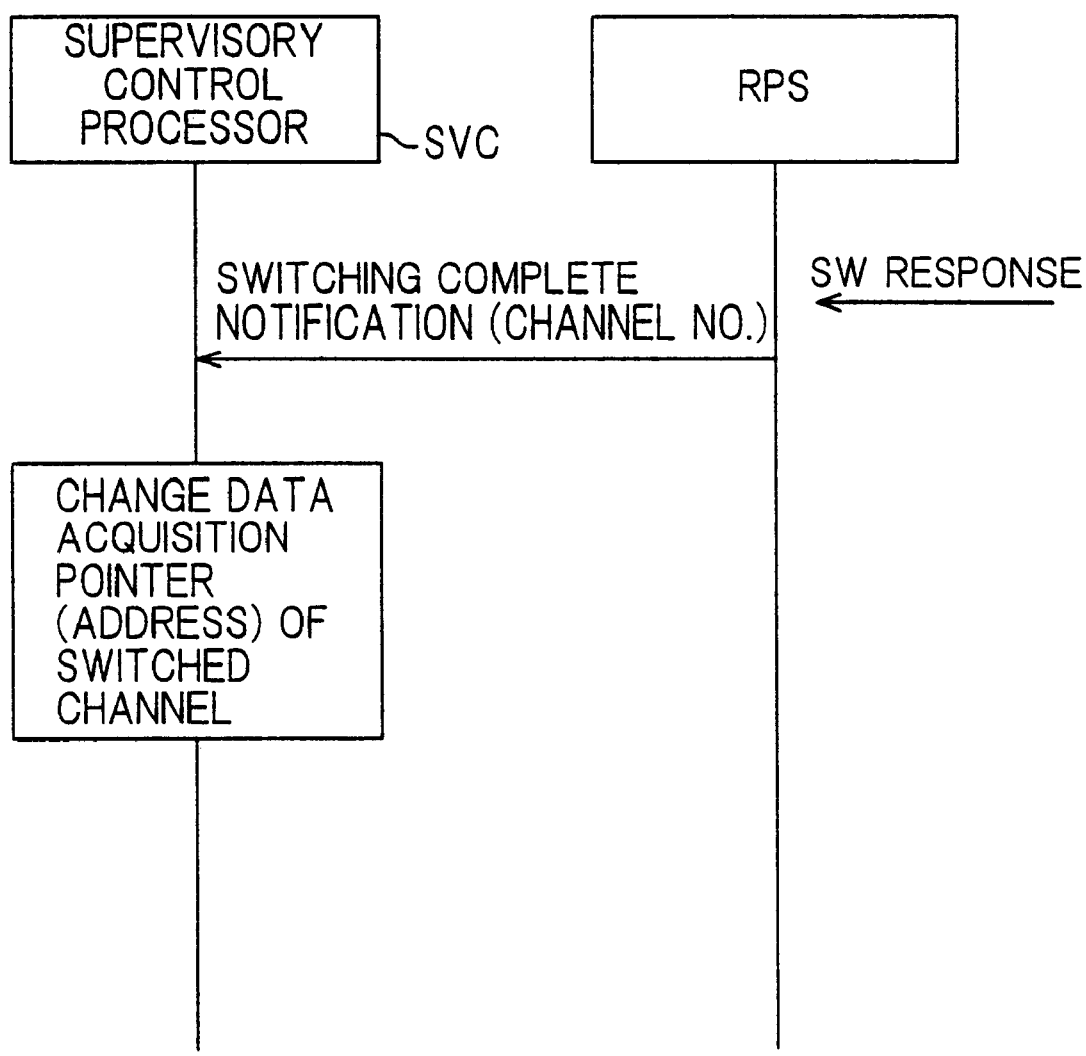
FIG. 13 is a diagram useful in describing the processing of a supervisory control processor.

(e) Control executed by supervisory control processor to make identifiers identical FIG. 13 is a diagram useful in describing processing executed by the supervisory control processor SVC in order to make identifiers the same.

When a failure develops in the unit of an ith transmission line (channel) or in an ith wireless channel, the radio protection switching device RPS drives the changeover switch SWi to switch it from the working unit MSTUi to the protection unit $MSTU_0$. If a changeover complete response is generated by the switch $SW_i$, the radio protection switching device RPS sends the supervisory control processor SVC notification of changeover completion, which includes the channel number (of the ith channel). In response, the supervisory control processor SVC updates the table TBL. More specifically, the supervisory control processor SVC rewrites the I/O address of the ith working unit $MSTU_i$, which has been stored in correspondence with the identifier ILi of the ith transmission channel, as the I/O address of the protection unit $MSTU_0$. Thereafter, the supervisory control processor SVC acquires the status information of the ith transmission line (ith channel) from the protection unit $MSTU_0$, adds on the corresponding identifier ILi and transmits the information to the host device OPS.

As a result, since the line supervisor at the host device OPS is capable of performing end-to-end line supervision, it is unnecessary to be aware the wireless switching state.

Further, since it is possible to supervise the wireless switching state simultaneously, a supervisory mode no different from that of the prior art can be provided for wireless channel maintenance personnel.

Though the second embodiment is constructed independently of the first embodiment, the first and second embodiments can be combined.

(C) Third embodiment for shortening rollback time (a) Background of third embodiment In the wireless transmission apparatus of the first embodiment in which the baseband processor and wireless transceiver are unified, the setting/supervisory controller SCSU (FIG. 1) copies channel setting information from the working unit $MSTU_i$ to the protection unit $MSTU_0$ when the working unit of the ith transmission channel is changed over to the protection unit, and the setting information regarding the ith transmission channel following unit changeover is altered in the protection unit $MSTU_0$.

Accordingly, in a case where recovery from failure in the working unit $MSTU_i$ has been accomplished, the setting information that has been set in the protection unit $MSTU_0$ must be re-copied to the working unit $MSTU_i$ before rollback from the protection unit to the working unit is carried out. As problem that arises is lengthening of rollback time. Though there is a wireless transmission apparatus in which alteration of setting information is not allowed during unit changeover in order to shorten rollback time, this expedient lacks flexibility in terms of altering settings.

For this reason, the third embodiment provides a wireless transmission apparatus in which it is possible to realize both shortening of rollback time and flexibility in terms of changing settings.

(b) Overview of third embodiment

The foregoing problem is solved in the following manner: When the setting/supervisory controller SCSU writes setting information from an external device such as the host device OPS to the protection unit $MSTU_0$ in response to an operation for changing the setting information after unit changeover, the setting/supervisory controller SCSU determines whether working/protection switching is in progress. If such switching is in progress, the setting information is written to both the protection unit $MSTU_0$ and the working unit $MSTU_i$ that was active prior to the changeover. If this arrangement is adopted, the setting information of the protection unit $MSTU_0$ and the setting information of the working unit $MSTU_i$ that prevailed prior to the changeover will always coincide. As a result, it will be unnecessary to copy setting information at the time of rollback, thereby making it possible to curtail rollback time.

Figure 14:
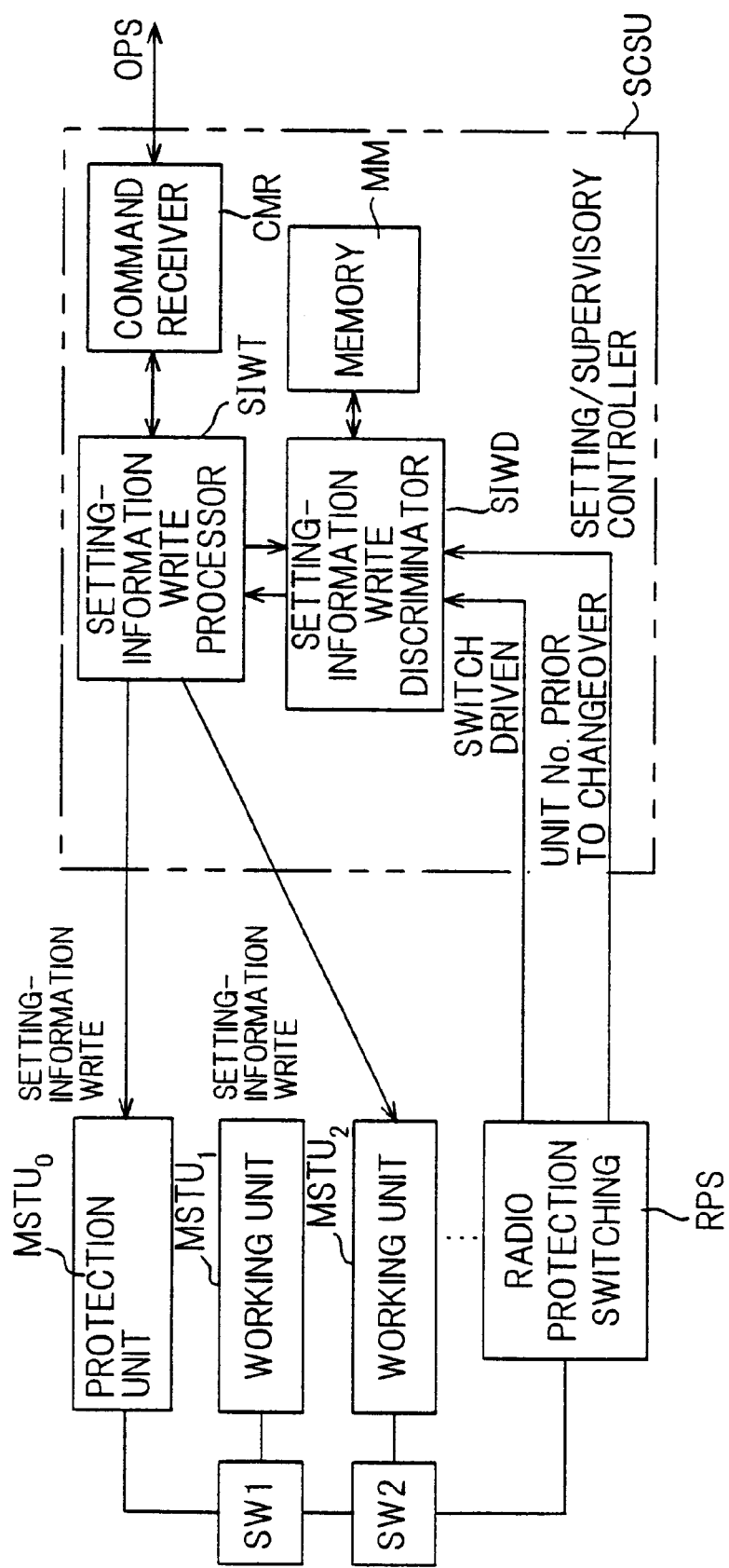
FIG. 14 is a functional block diagram of setting/supervisory control in a third embodiment of the invention.

FIG. 14 is a functional block diagram of the setting/supervisory controller SCSU adapted to implement the operation described above. The setting/supervisory controller SCSU includes a command receiver CMR for receiving a command (setting information) from the host device; a memory MM for storing whether working/protection switching is in progress as well as the unit number of a working unit undergoing switching; a setting-information write discriminator SIWD for judging whether setting information that enters from the host device is to be written to both the protection unit $MSTU_0$ and working unit $MSTU_i$; and a setting-information write processor SIWT for writing setting information to a prescribed unit.

If changeover of a working unit to a protection unit occurs, the radio protection switching device RPS inputs information, which indicates switch drive and the number of the working unit (namely the number of the transmission channel) prior to changeover, to the setting/supervisory controller SCSU. As a result, the setting-information write discriminator SIWD of the setting/supervisory controller SCSU stores the switching information (working/protection switching in progress and unit number of the working unit that was active prior to the changeover) in the memory MM. If setting information from an external device such as the host device OPS to a prescribed transmission channel is received under these conditions, the setting-information write discriminator SIWD investigates the content stored in memory, determines whether working/protection unit changeover is in progress on the above-mentioned transmission channel and communicates the result of determination to the setting-information write processor SIWT. If unit changeover is not in progress, the setting-information write processor SIWT writes the setting information only to the working unit. If unit changeover is in progress, then the setting-information write processor SIWT writes the setting information to both the protection unit $MSTU_0$ and the working unit $MSTU_i$ that was active prior to the changeover.

It should be noted that when a working unit recovers and rollback from the protection unit to the working unit occurs, the radio protection switching device RPS inputs information, which indicates completion of rollback and the number of the working unit (i.e. the number of the transmission channel), to the setting/supervisory controller SCSU. In response, the setting-information write discriminator SIWD of the setting/supervisory controller SCSU deletes the working/protection switching-in-progress information and the number of the working unit prior to the changeover from the memory MM.

(c) Construction of wireless transmission apparatus of third embodiment

Figure 15:
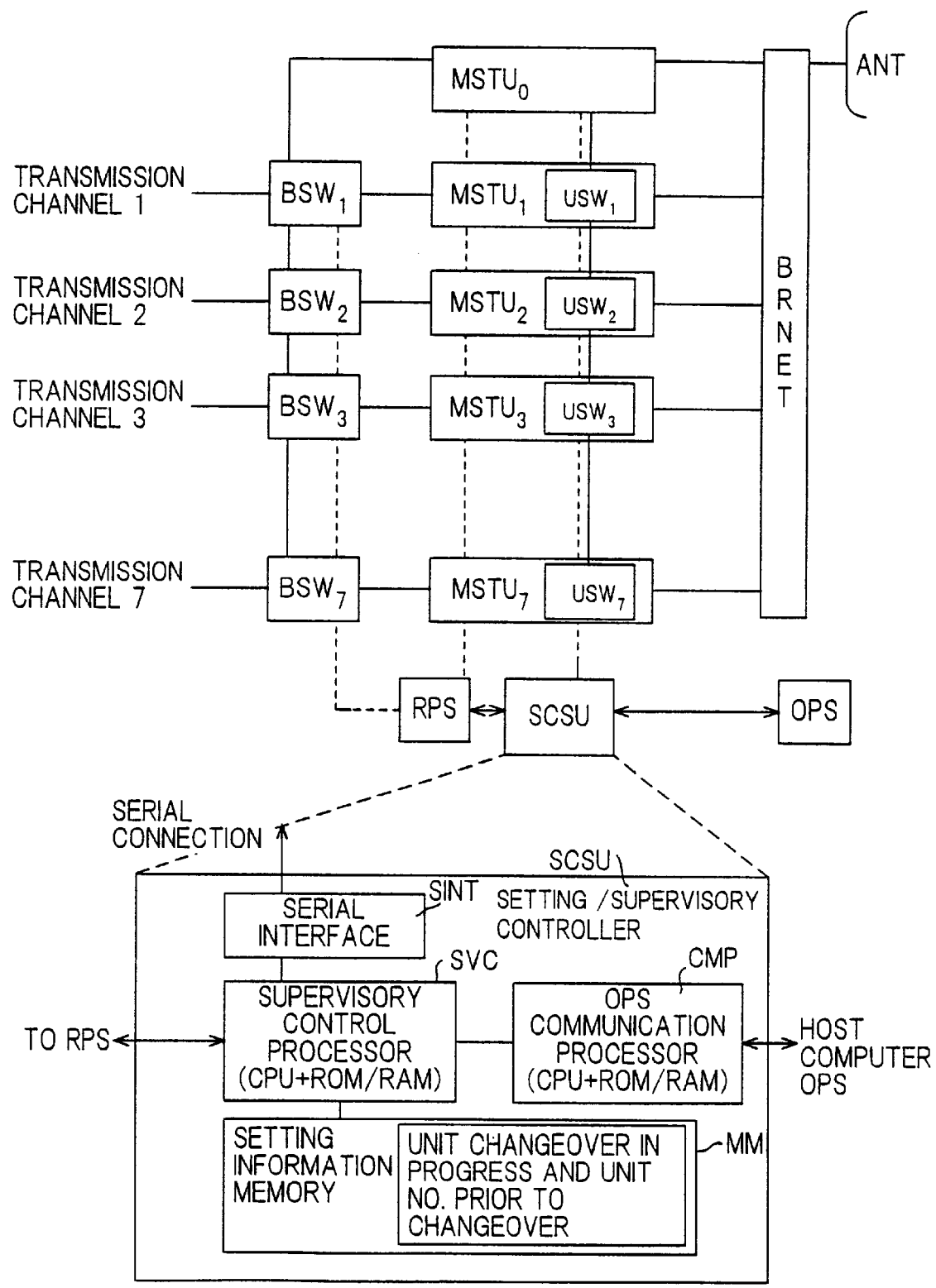
FIG. 15 is a block diagram showing the construction of a wireless transmission apparatus according to a third embodiment of the invention.

FIG. 15 is a block diagram showing the construction of a wireless transmission apparatus according to a third embodiment, in which components identical with those of the first embodiment in FIG. 1 are designated by like reference characters. The apparatus includes the units $MSTU_0$–$MSTU_7$ each obtained by unifying a baseband processor, a modulator/demodulator and a wireless transceiver. Units $MSTU_1$–$MSTU_n$ are working units provided for corresponding ones of transmission channels 1–n, and the unit $MSTU_0$ is a protection unit provided for standby. The apparatus further includes the receiving filter & antenna duplexer BRNET; the antenna ANT; the unit changeover switches $BSW_1$–$BSW_7$ provided on the transmission line side externally of the working units $MSTU_1$–$MSTU_n$, respectively, for changing over between working and protection units; the hitless changeover switches $USW_1$–$USW_7$ provided on the wireless side internally of the working units $MSTU_1$–$MSTU_n$ for working/protection switching of wireless channels without instantaneous disconnection; and the radio protection switching device RPS for executing unit changeover control at the time of unit failure by driving the unit changeover switches $BSW_1$–$BSW_7$ in accordance with predetermined logic, and for executing hitless switching control at the time of wireless channel failure by driving the hitless changeover switches $USW_1$–$USW_7$. The apparatus further includes the setting/supervisory controller SCSU and the host device OPS. The setting/supervisory controller SCSU, which is connected to each of the units $MSTU_0$–$MSTU_7$ so as to be capable of communicating therewith, receives setting information from the host device, writes the setting information to a prescribed unit and, at the time of working/protection unit changeover, copies the setting information of the working unit to the protection unit.

The setting/supervisory controller SCSU includes the serial interface SINT, the supervisory control processor SVC for performing setting/supervisory control, the communication processor CMP, which is implemented by a microcontroller, for controlling communication with the host device OPS, and the memory MM. The latter stores setting information, which has been set for each transmission line from the host device OPS, status information acquired from each unit and information relating to whether a unit is undergoing changeover and the number of the unit that was active before changeover.

There are cases where the method of using section overhead (SOH) bytes in the SDH format differs depending upon user. Accordingly, it is so arranged that various methods of using SOH can be set in a working unit MSTU. The set value is input to the setting/supervisory controller SCSU from the host device OPS and stored in the memory MM. In a case where the working unit has been replaced or a working/protection unit changeover has been made, the set value is reset in or copied to a new unit or protection unit.

Figure 16:
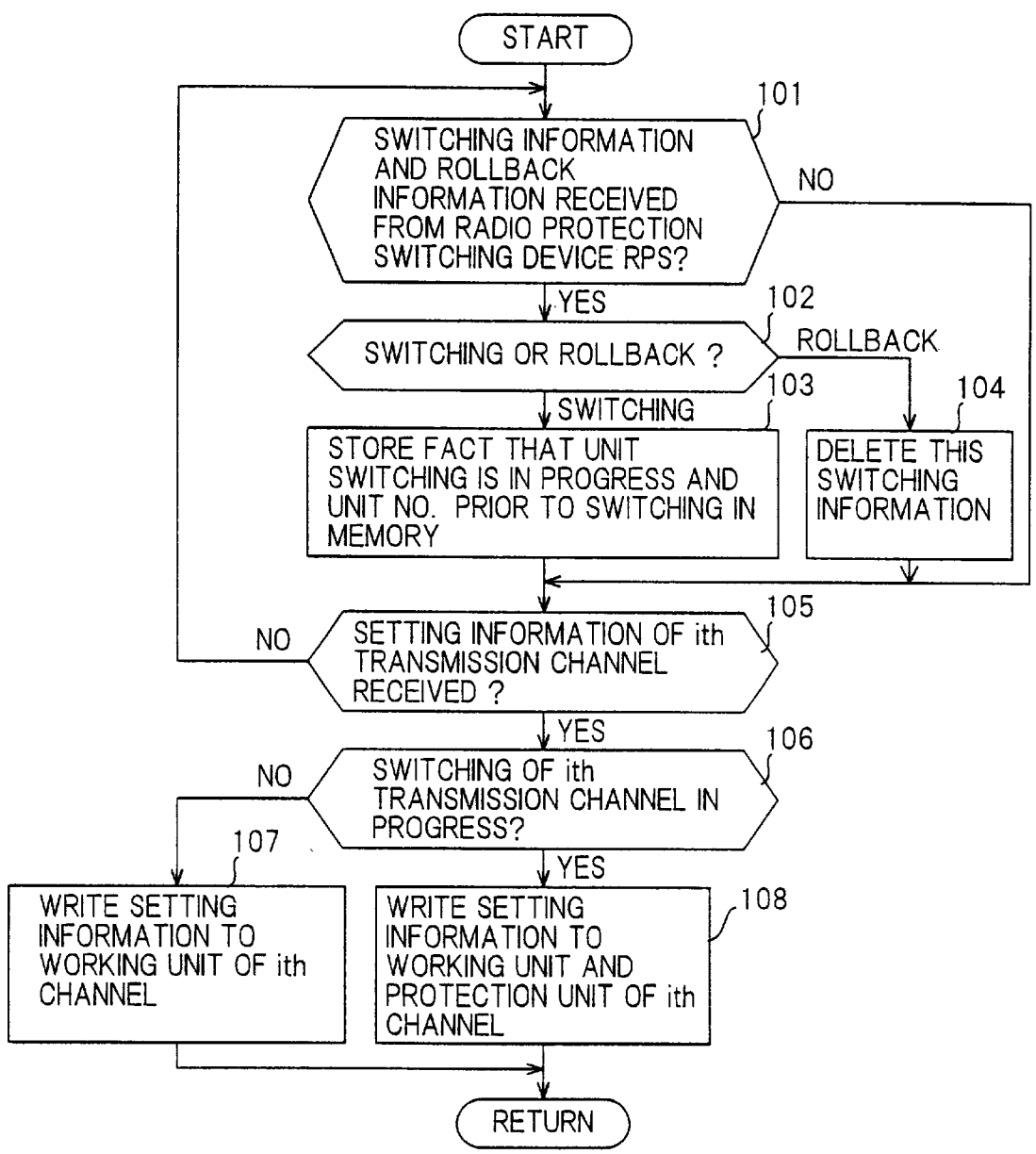
FIG. 16 is a flowchart of setting information processing.

FIG. 16 is a flowchart of setting information processing executed by the supervisory control processor SVC.

The supervisory control processor SVC determines at step 101 whether switching information or rollback information has been received from the radio protection switching device RPS. If the answer is "YES", the supervisory control processor SVC determines whether the information is switching information or rollback information (step 102). If the information is switching information regarding the ith channel, then the fact that changeover of the unit of the ith channel is in progress and the number of the unit prior to changeover are saved in the memory MM (step 103). If the information is rollback information regarding the ith channel, then the switching information of the ith channel is deleted from the memory MM (step 104).

Thereafter, or if neither setting information nor rollback information is received at step 101, the supervisory control processor SVC determines whether setting information relating to the ith transmission channel has been received from the host device OPS (step 105). If this information has not been received, then control returns to step 101 and processing from this step onward is repeated. If this information has been received, then the supervisory control processor SVC refers to the stored content of the memory MM and determines whether the ith transmission channel is undergoing unit changeover (step 106).

If the ith transmission channel is not undergoing unit changeover, the supervisory control processor SVC writes setting information only to the working unit of the ith line. If the ith transmission channel is undergoing unit changeover, then the supervisory control processor SVC writes setting information to both the protection unit and the working unit of the ith line (step 108). Control then returns to step 101 and the supervisory control processor SVC repeats processing from step 101 onward.

(D) Fourth embodiment for shortening changeover time (a) Background of third embodiment In the wireless transmission apparatus of the first embodiment in which the baseband processor and wireless transceiver are unified, the setting/supervisory controller SCSU must copy line setting information from the working unit $MSTU_i$ to the protection unit $MSTU_0$ when the working unit of the ith transmission channel is changed over to the protection unit. With the conventional wireless transmission apparatus, setting information must be copied from the working unit $MSTU_i$ to the protection unit $MSTU_0$ whenever line switching occurs, even if the settings in the baseband processors of the working unit $MSTU_i$ and protection unit $MSTU_0$ are identical. This invites prolongation of channel switching time.

In the fourth embodiment, therefore, it is determined whether the setting information of the working unit $MSTU_i$ about to be changed over is the same as the setting information of the protection unit $MSTU_0$. If these items of information are identical, processing for copying the setting information is eliminated to thereby shorten channel switching time. In order to realize this, the supervisory control processor SVC of the setting/supervisory controller SCSU is provided with a function for comparing the setting information of the working unit $MSTU_i$ and the setting information of the protection unit $MSTU_0$ when the status of a unit changeover switch changes.

Figure 17:
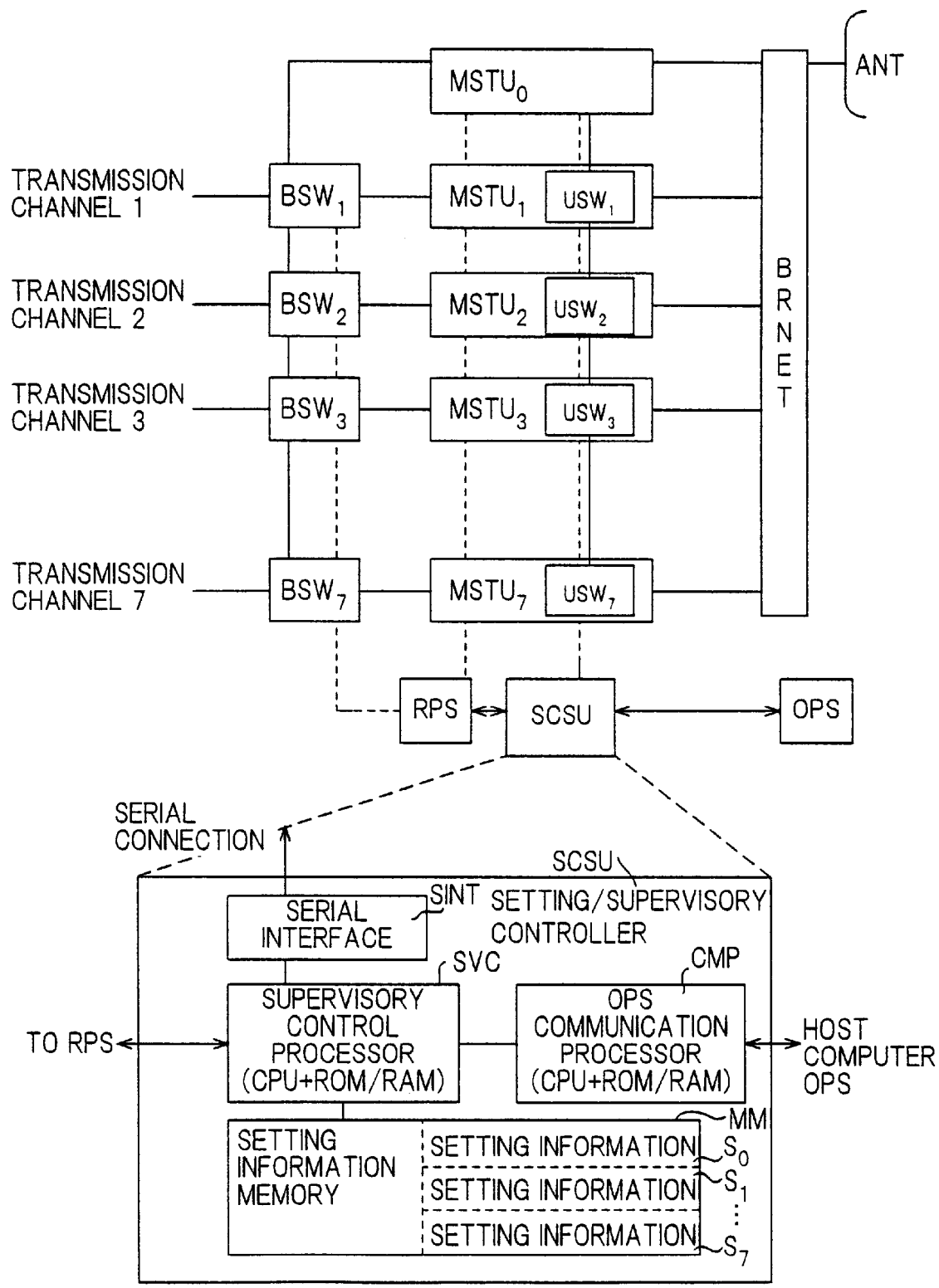
FIG. 17 is a block diagram showing the construction of a wireless transmission apparatus according to a fourth embodiment of the invention.

(b) Construction of wireless transmission apparatus according to fourth embodiment FIG. 17 is a block diagram showing the construction of a wireless transmission apparatus according to a fourth embodiment, in which components identical with those of the first embodiment in FIG. 1 are designated by like reference characters. The apparatus includes the units $MSTU_0$–$MSTU_7$ each obtained by unifying a baseband processor, a modulator/demodulator and a wireless transceiver. Units $MSTU_1$–$MSTU_n$ are working units provided for corresponding ones of transmission channels 1–n, and the unit $MSTU_0$ is a protection unit provided for standby. The apparatus further includes the receiving filter & antenna duplexer BRNET; the antenna ANT; the unit changeover switches $BSW_1$–$BSW_7$ provided on the transmission line side externally of the working units $MSTU_1$–$MSTU_n$, respectively, for changing over between working and protection units; the hitless changeover switches $USW_1$–$USW_7$ provided on the wireless side internally of the working units $MSTU_1$–$MSTU_n$ for working/protection switching of wireless channels hitlessly; and the radio protection switching device RPS for executing unit changeover control at the time of unit failure by driving the unit changeover switches $BSW_1$–$BSW_7$ in accordance with predetermined logic, and for executing hitless switching control at the time of wireless channel failure by driving the hitless changeover switches $USW_1$–$USW_7$.

The apparatus further includes the setting/supervisory controller SCSU, which is connected to each of the units $MSTU_0$–$MSTU_7$ so as to be capable of communicating therewith, receives setting information from the host device, writes the setting information to a prescribed unit and, at the time of working/protection unit changeover, copies the setting information of the working unit to the protection unit.

The setting/supervisory controller SCSU includes the serial interface SINT, the supervisory control processor SVC for performing setting/supervisory control, the communication processor CMP, which is implemented by a microcontroller, for controlling communication with the host device OPS, and the memory MM. The latter stores setting information S0–S7, which has been set for respective transmission channels from the host device OPS, status information acquired from each unit, etc.

Figure 18:
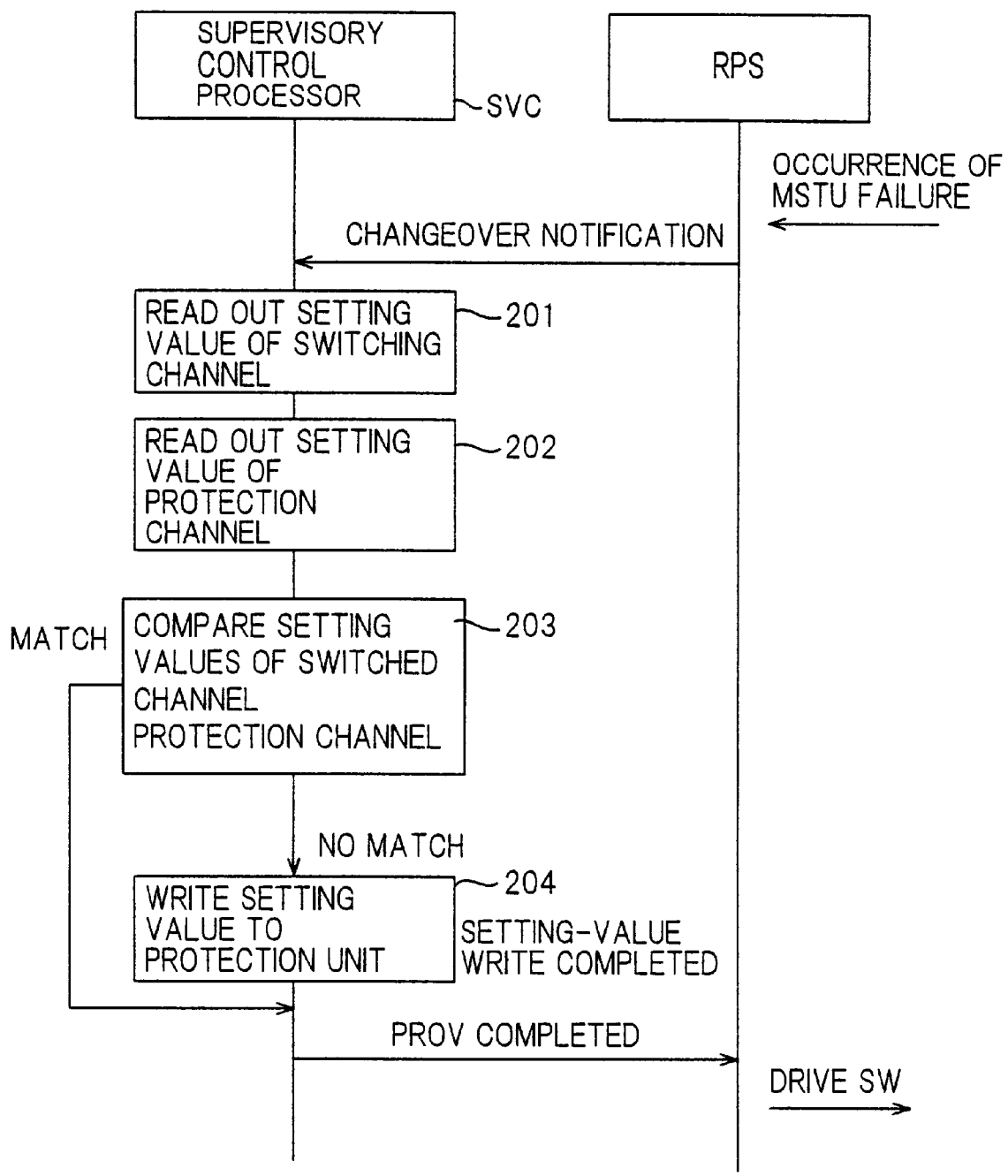
FIG. 18 is a flowchart of processing for copying setting information at unit changeover.
Figure 19:
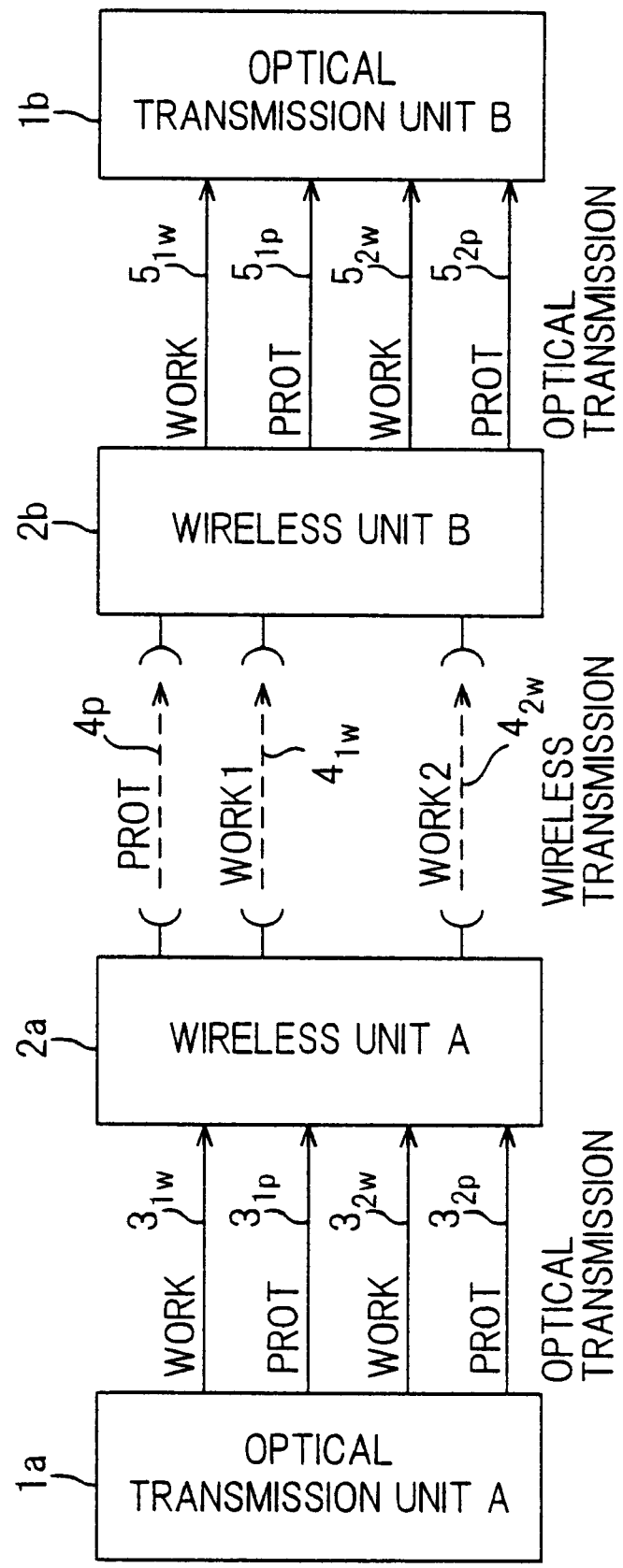
FIG. 19 is a diagram showing the construction of an SDH network according to the prior art.
Figure 20:
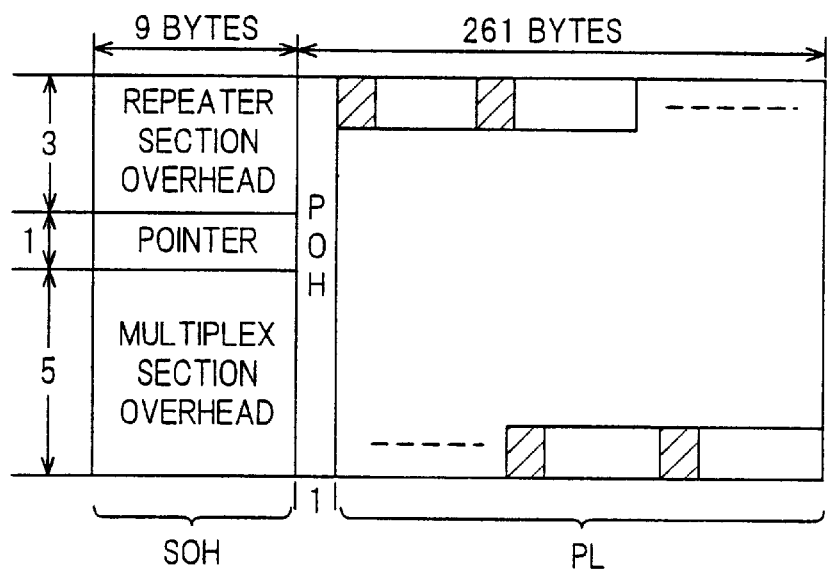
FIG. 20 is a diagram for describing the structure of an SDH frame according to the prior art.
Figure 21:
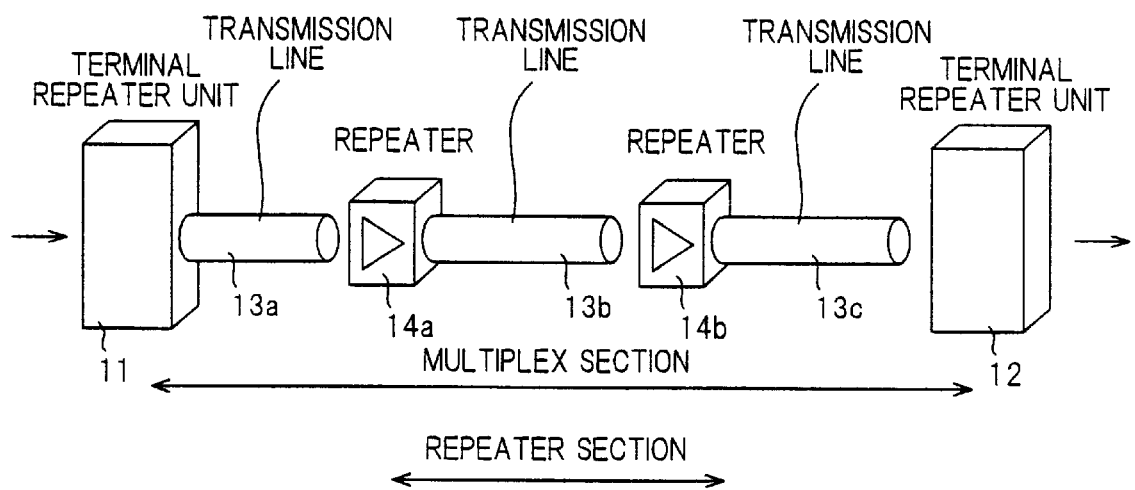
FIG. 21 is a diagram for describing a multiplex section and a regenerator section according to the prior art.
Figure 24A:
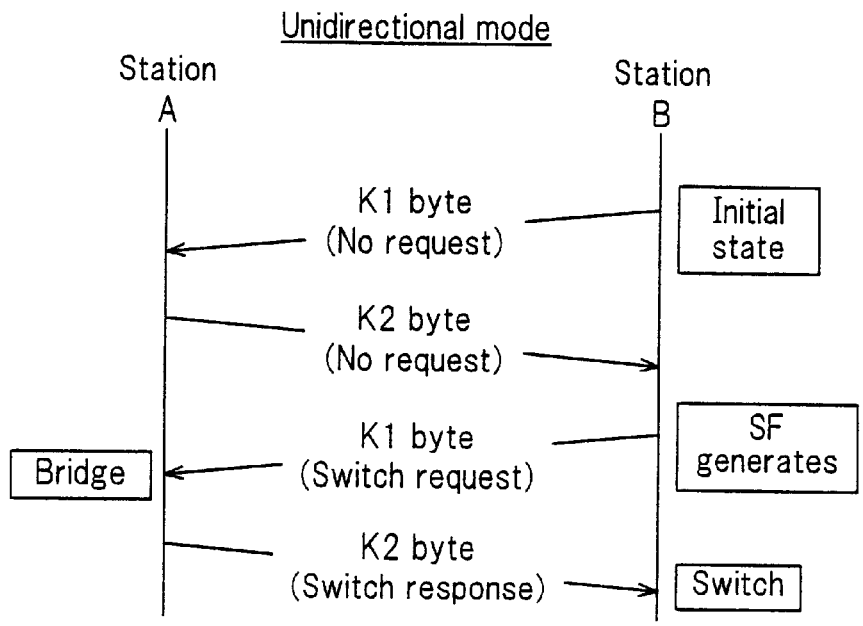
FIGS. 24A, 24B are diagrams for describing switching sequences using the K1, K2 bytes according to the prior art.
Figure 24B:
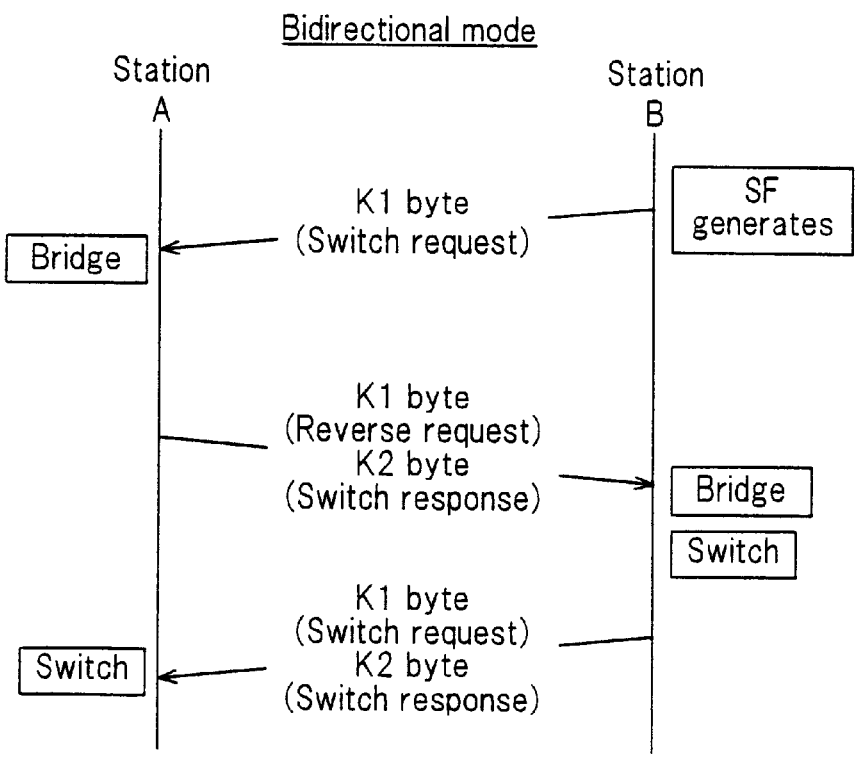

FIG. 18 is a flowchart of setting information copying processing executed by the supervisory control processor SVC at the time of unit changeover.

If a failure develops in the working unit $MSTU_i$ of the ith transmission channel, the radio protection switching device RPS notifies the supervisory control processor SVC of unit changeover on the ith transmission channel (ith channel). In response, the supervisory control processor SVC reads the setting information of the ith channel and protection channel out of the memory MM (steps 201, 202) and determines whether the setting information of the two channels is identical (step 203) If the compared items of information are identical, the supervisory control processor SVC does not execute copying processing and notifies the radio protection switching device RPS of the completion of copying (PROV complete). If the compared items of information are not identical, however, the supervisory control processor SVC copies the setting value of the working unit $MSTU_i$ of the ith channel to the protection unit $MSTU_0$ (step 204) and then notifies the radio protection switching device RPS of the completion of copying (PROV complete).

Thus, in accordance with the present invention, a baseband processor, modulator/demodulator and wireless transceiver can be unified to lower the cost of hardware and conserve space. Further, working and protection signals can be synchronized and hitless switching performed when a failure develops in a wireless channel.

Further, in accordance with the present invention, a working unit is provided with a unit packaging detector for detecting whether the unit has or has not been packaged with the wireless transmission apparatus, and a radio protection switching device switches between working units and the protection unit automatically by controlling the unit changeover switch in response to non-packaging of the unit. This makes it possible to switch from the working unit to the protection unit automatically when a unit is replaced. This makes it simpler to replace the unit.

Further, the present invention is such that in a case where BB line failure is detected even if changeover has been made to the protection channel by hitless synchronous switching in response to failure of a wireless channel, this is construed as being a failure within the unit, unit changeover is performed and communication can be continued.

Further, in accordance with the present invention, a table is provided for storing correspondence between the identifiers of transmission lines and units. When a working unit has been switched to the protection unit, the content of the table is altered in such a manner that the protection unit will correspond to the identifier that prevailed previously. As a result, even if a changeover occurs between working and protection units, the protection unit and the working unit prior to its changeover are considered units on the same transmission line and the identifiers appended to the status information of each unit can be made the same, thereby facilitating status management. In other words, since the line supervisor at the host device is capable of performing end-to-end line supervision, it is unnecessary for the supervisor to be aware the wireless switching state.

Further, in accordance with the present invention, it is so arranged that when setting information relating to the ith transmission channel is received from a host device, whether or not working/protection unit changeover has been performed and the unit number of the working unit prior to its changeover are investigated. If unit changeover is not in progress, setting information is written only to the working unit. If unit changeover is in progress, then the setting information is written to both the protection unit and the working unit that was active prior to the changeover. During unit changeover, therefore, the setting information of the protection unit and the setting information of the working unit that was active prior to the changeover can always be made to coincide. When the working unit recovers and rollback is performed from the protection unit to the working unit, it is unnecessary to copy the setting information from the protection unit to the working unit. As a result, rollback to the working unit can be performed in a short period of time. In addition, setting information can be written to each unit irrespective of whether changeover is in progress or not.

Further, a supervisory controller compares the setting information of the working unit with that of the protection unit at the time of unit changeover from the working unit to the protection unit. If the compared items of information do not match, the supervisory controller copies the setting information from the working unit to the protection unit. If the items of information match, the information is not copied. Accordingly, when a working unit develops a failure and a changeover from the working unit to the protection unit is performed, copying of information to the protection unit can be eliminated if the information coincides. As a result, it is possible to shorten line switching time.

As many apparently widely different embodiments of the present invention can be made without departing from the spirit and scope thereof, it is to be understood that the invention is not limited to the specific embodiments thereof except as defined in the appended claims.

What is claimed is:

1. An SDH wireless transmission apparatus in which each channel of working channels and at least one protection channel are provided with a unit obtained by unifying a baseband processor having a function for terminating an SDH interface and a wireless transceiver having a modulating/demodulating function and a transceiving function, a unit changeover switch for switching between a working unit and the protection unit is provided on a wired side externally of the working units, and there is provided a radio protection switching means for acquiring failure detection information from each working unit and switching between working units and the protection unit by driving the unit changeover switch in accordance with predetermined logic, wherein each of said working units comprises:

a wireless-channel failure detector for detecting a failure that has occurred in a working wireless channel;

a synchronization detecting circuit for detecting synchronization between a working wireless channel and a protection wireless channel;

a receiving switch for selecting a signal from either the protection wireless channel or a working wireless channel; and a unit failure detector for detecting a failure that requires switching of the unit;

wherein when a failure develops in a wireless channel and a working wireless channel and the protection wireless channel are synchronized, said radio protection switching means controls said receiving switch and selects a signal from the protection wireless channel and inputs this signal to the baseband processor without instantaneous disconnection; and when failure that requires switching of a unit occurs, said radio protection switching means controls said unit changeover switch to switch between a working unit and the protection unit.

2. The apparatus according to claim 1, wherein each working unit has a transmitting switch for selectively transmitting a signal solely from a working wireless channel or transmitting a signal via working and protection wireless channels simultaneously;

said radio protection switching means requesting radio protection switching means of an opposite station to transmit a signal to working and protection wireless channels simultaneously when a failure occurs in a wireless channel; and the radio protection switching means of the opposite station responding to said request by changing over the transmitting switch of a working unit at the opposite station to send a signal to the working and protection wireless channels simultaneously.

3. The apparatus according to claim 1, wherein each working unit has a unit-packaging detector for detecting whether the unit has been packaged with the wireless transmission apparatus;

said radio protection switching means switching between a working unit and the protection unit by controlling said unit changeover switch in response to non-packaging of the unit.

4. The apparatus according to claim 1, wherein each working unit has a channel failure detector, which is provided at a point downstream of the signal from the receiving switch, for detecting channel failure after synchronous switching, and said radio protection switching means switches between a working unit and the protection unit by controlling said unit changeover switch in response to occurrence of channel failure.

5. The apparatus according to claim 1, further comprising a supervisory controller for acquiring the status of each unit of the wireless transmission apparatus, appending an identifier of the transmission channel to which the unit belongs to the acquired information and then reporting the information to a host device;

said supervisory controller having a table for retaining correspondence between the identifiers of the transmission channels and units, wherein when a working unit has been switched to the protection unit, said supervisory controller alters content of said table in such a manner that the protection unit will correspond to the identifier that prevailed previously.

6. The apparatus according to claim 1, further comprising a supervisory controller for receiving a command from a host device and writing setting information, which is based upon this command, to a prescribed unit;

said supervisory controller including:

a command receiver for receiving a command from the host device;

means for retaining whether unit changeover from a working unit to the protection unit has occurred as well as the number of this working unit; and means for writing the setting information to a working unit when unit changeover has not occurred and, when unit changeover has occurred, writing the setting information to both the protection unit and the working unit that was acting prior to the changeover.

7. The apparatus according to claim 6, wherein said supervisory controller includes:

setting-information comparison means for comparing setting information of a working unit and setting information of the protection unit; and means for copying the setting information of the working unit to the protection unit when the working unit is switched to the protection unit; wherein no copying of setting information is performed if the setting information of the working unit matches the setting information of the protection unit and copying of setting information is performed if the setting information of the working unit does not match the setting information of the protection unit.

* * * * *